United States Patent
Hayasaki

(10) Patent No.: US 9,599,950 B2
(45) Date of Patent: Mar. 21, 2017

(54) IMAGE FORMING APPARATUS AND A POWER SUPPLY APPARATUSES FOR CONTROLLING A TURN-ON TIMING OF A SWITCHING ELEMENT WHOSE OUTPUT VOLTAGE DECREASES

(71) Applicant: CANON KABUSHIKI KAISHA, Tokyo (JP)

(72) Inventor: Minoru Hayasaki, Mishima (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 261 days.

(21) Appl. No.: 14/296,235

(22) Filed: Jun. 4, 2014

(65) Prior Publication Data

US 2014/0369086 A1 Dec. 18, 2014

(30) Foreign Application Priority Data

Jun. 14, 2013 (JP) ................................ 2013-125587

(51) Int. Cl.
*H02M 3/335* (2006.01)
*G03G 15/00* (2006.01)
*H02M 1/00* (2006.01)

(52) U.S. Cl.
CPC ............ *G03G 15/80* (2013.01); *H02M 3/335* (2013.01); *H02M 3/33523* (2013.01); *H02M 3/33538* (2013.01); *H02M 3/33546* (2013.01); *H02M 2001/0032* (2013.01); *Y02B 70/16* (2013.01)

(58) Field of Classification Search
CPC ............................ G03G 15/80; H02M 3/33523
USPC .......................................................... 363/20
See application file for complete search history.

(56) References Cited

U.S. PATENT DOCUMENTS

| 8,242,873 B2 | 8/2012 | Hayasaki et al. |
| 8,503,197 B2 | 8/2013 | Hayasaki et al. |
| 2009/0302817 A1* | 12/2009 | Nagai .................... H02M 3/156 323/282 |
| 2010/0289607 A1* | 11/2010 | Liu .......................... H01F 3/14 336/65 |

(Continued)

FOREIGN PATENT DOCUMENTS

| JP | 3567355 B2 | 9/2004 |
| JP | 3665984 B2 | 6/2005 |

OTHER PUBLICATIONS

U.S. Appl. No. 14/188,508, filed Feb. 24, 2014. Applicant: Minoru Hayasaki.

*Primary Examiner* — Matthew Nguyen
*Assistant Examiner* — Trinh Dang
(74) *Attorney, Agent, or Firm* — Fitzpatrick, Cella, Harper & Scinto

(57) ABSTRACT

The power supply apparatus includes a transformer, a switch element that drives a primary side of the transformer, and a control unit that controls a drive frequency of the switch element, wherein when a state of driving the switch element at a first drive frequency is shifted to a state of driving the switch element at a second drive frequency lower than the first drive frequency, the control unit turns on the switch element at a first timing in which a displacement amount of the transformer caused by the drive of the transformer becomes a first displacement amount and at a second timing in which the displacement of the transformer becomes a second displacement amount smaller than the first displacement amount.

14 Claims, 12 Drawing Sheets

(56) References Cited

U.S. PATENT DOCUMENTS

| | | | |
|---|---|---|---|
| 2011/0205770 A1* | 8/2011 | Isogai | H02M 1/32 |
| | | | 363/78 |
| 2011/0273910 A1* | 11/2011 | Baurle | H02M 3/33515 |
| | | | 363/21.01 |
| 2013/0114175 A1* | 5/2013 | Song | H02M 1/32 |
| | | | 361/86 |
| 2013/0236206 A1 | 9/2013 | Shoji et al. | |
| 2013/0307917 A1 | 11/2013 | Hayasaki et al. | |

* cited by examiner

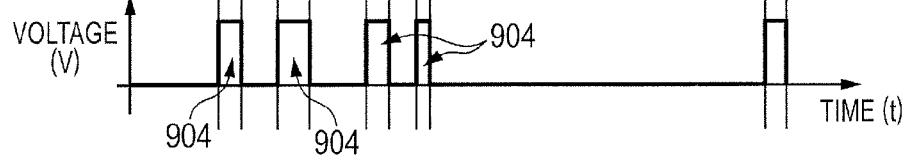
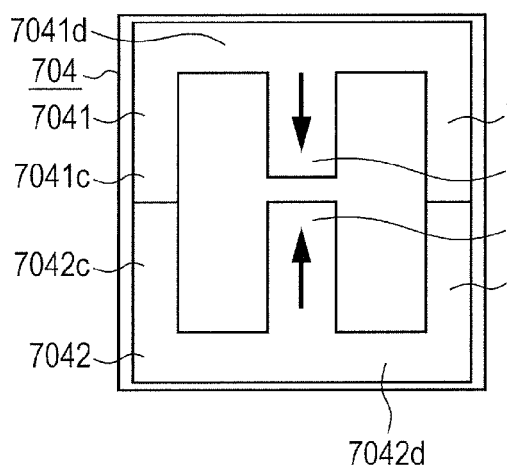
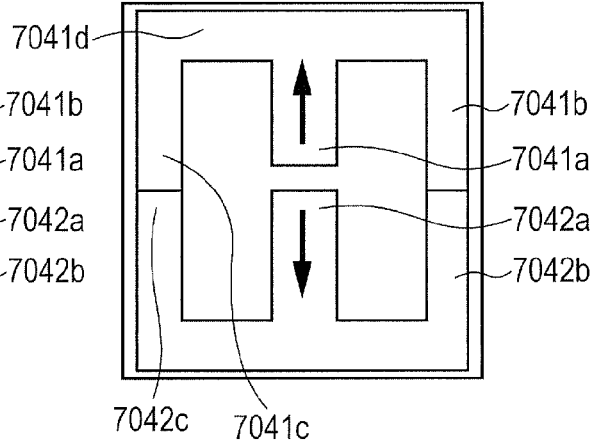
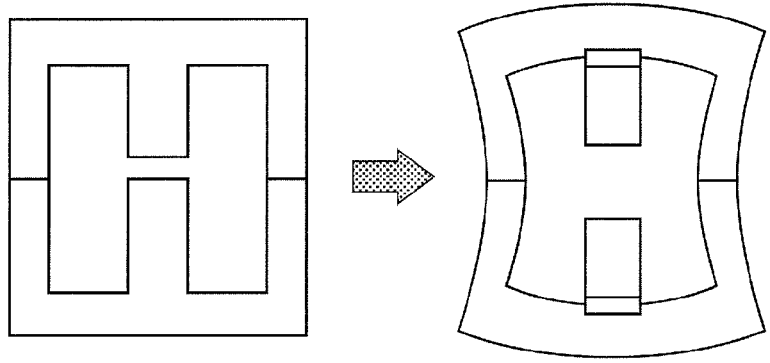

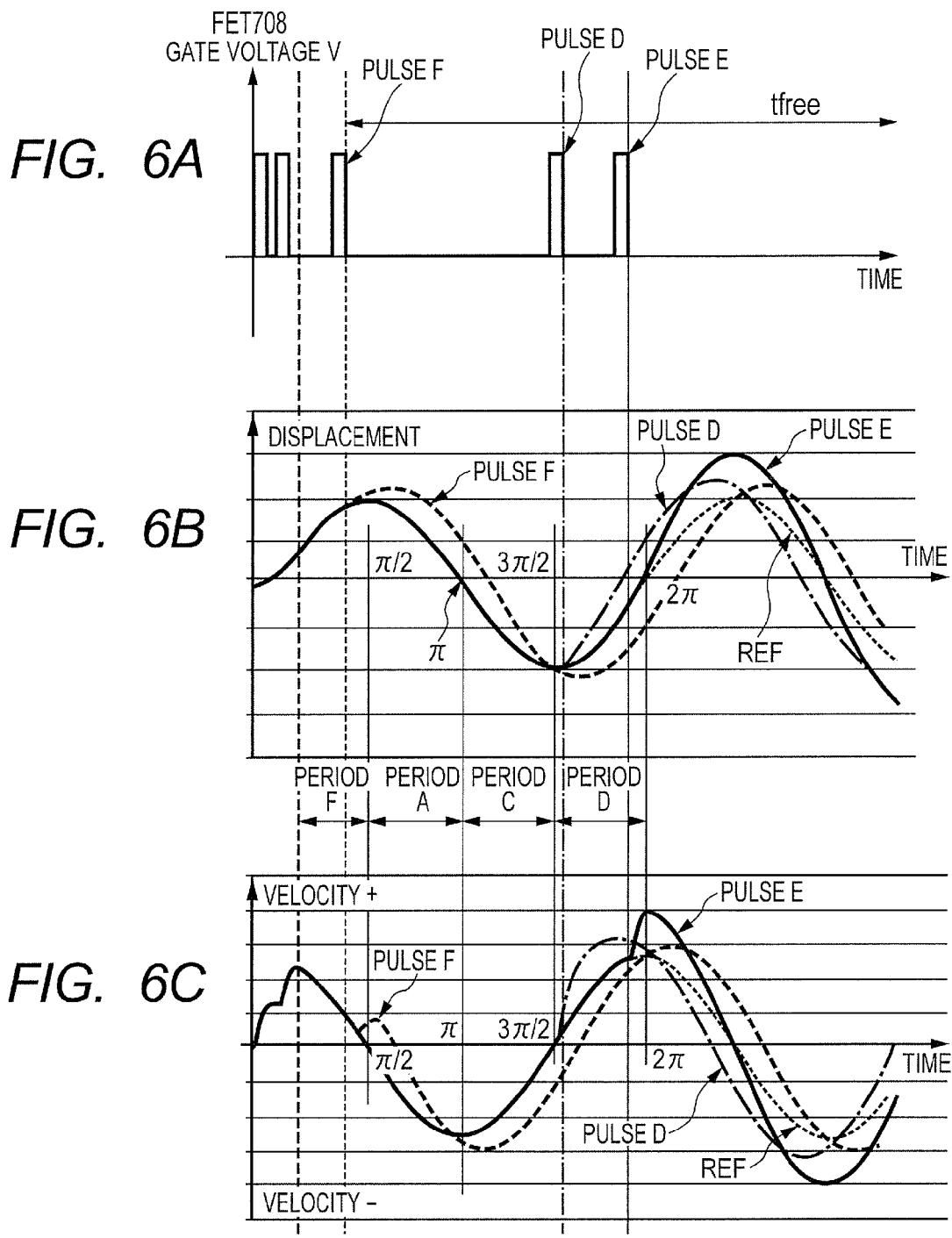

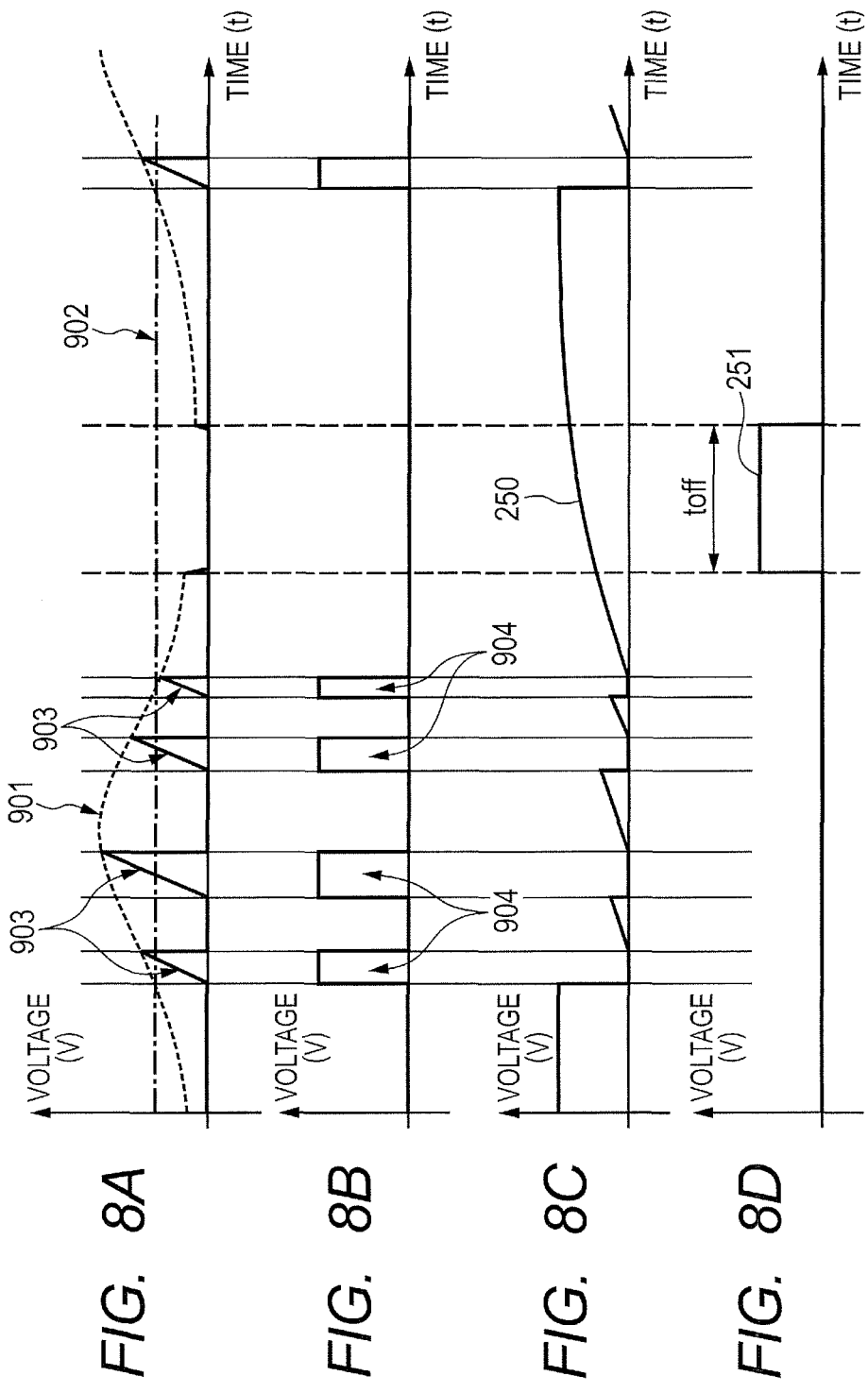

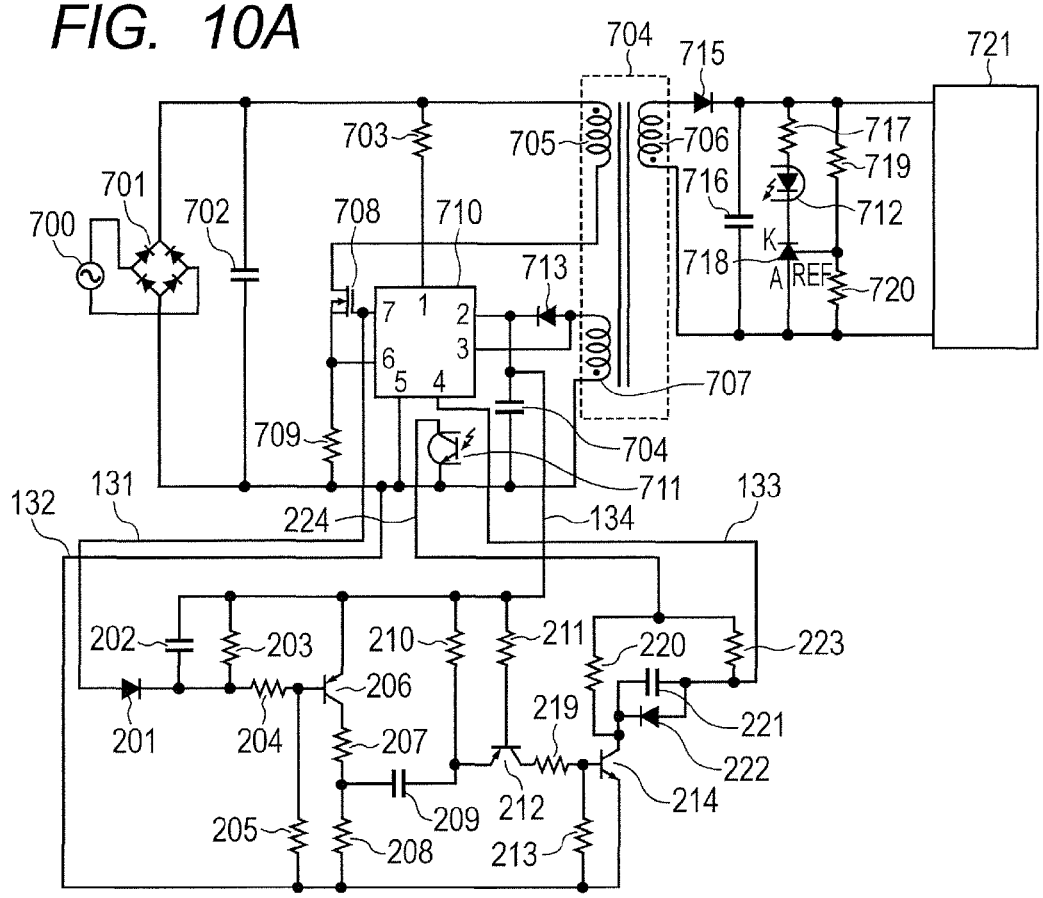
FIG. 10A
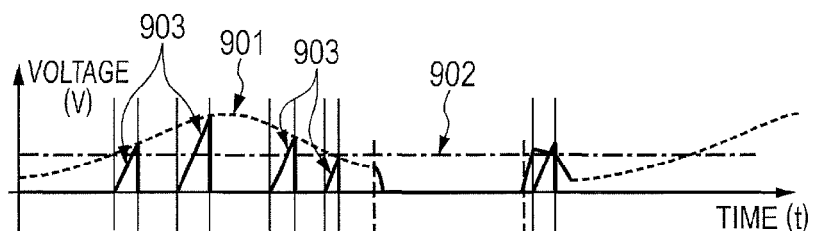
FIG. 10B
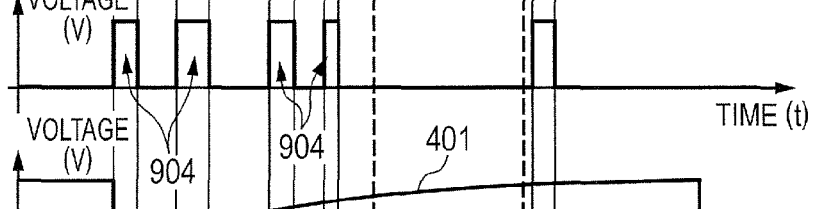
FIG. 10C
FIG. 10D
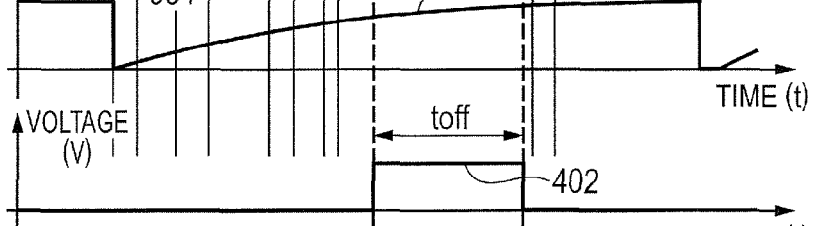
FIG. 10E

IMAGE FORMING APPARATUS AND A POWER SUPPLY APPARATUSES FOR CONTROLLING A TURN-ON TIMING OF A SWITCHING ELEMENT WHOSE OUTPUT VOLTAGE DECREASES

BACKGROUND OF THE INVENTION

Field of the Invention

The present invention relates to a power supply apparatus and an image forming apparatus, and particularly, to a DCDC converter apparatus.

Description of the Related Art

In a power supply apparatus, much of power loss during light-load operation is switching loss. To reduce the switching loss, an idle period of a switch element is increased to reduce the number of times of switching per unit time. However, the switching frequency decreases if the idle period of the switch element is increased. Therefore, the switching frequency enters an audible zone, and there is a problem of a groaning sound of a transformer. In a method of reducing the sound generated during standby of the power supply apparatus, a core material with a large cross-sectional area is used for the transformer to reduce a change ΔB in the magnetic flux density of the transformer. There is also a configuration of reducing the ON time of the switch element to reduce the current of the transformer per time.

An example of a unit for reducing the groaning sound of the transformer by a drive waveform of the transformer include the following configuration disclosed in Japanese Patent Nos. 3567355 and 3665984. A switching power supply apparatus that supplies electric power to a load circuit and a standby circuit includes a constant current circuit and a capacitor, and the constant current circuit raises the voltage of the capacitor at the start of the activation. The apparatus includes a soft start circuit that gradually increases the duty ratio of the switch element from zero based on the voltage of the capacitor. The soft start circuit forms a wave that gradually increases and decreases the drive current of the transformer, and the generation of sound is suppressed by reducing the change in the magnetic flux of the transformer. When the on-width of the switch element is actually set by a drive waveform that enters an idle period after gradual increase and gradual decrease, the groaning sound from the transformer is reduced.

However, when the effective cross-sectional area of the transformer is increased, or the turn ratio of the transformer is changed to suppress the change ΔB in the magnetic field density, the size of the transformer relative to the output power increases, leading to an increase in the cost. The ON time of the switching operation can be shortened to reduce the change in the current, i.e. change in the magnetic field, to reduce the groaning sound of the transformer. However, this increases the number of times of switching per unit time, and the switching loss increases. Furthermore, during the light-load operation with small output power, switching cannot be performed for a large number of times in the soft start and soft stop. To carry out the methods of Japanese Patent Nos. 3567355 and 3665984, the energy supplied in each switching operation needs to be reduced to increase the number of times of switching. Therefore, the energy per wave provided to the transformer becomes large if the switching loss is reduced by decreasing the number of times of switching, and the conventional power supply apparatus has a problem that a large sound is generated.

SUMMARY OF THE INVENTION

The present invention can reduce a sound generated from a transformer, while reducing a switching loss in a power supply apparatus.

To solve the problem, the present invention has the following configuration.

Further features of the present invention will become apparent from the following description of exemplary embodiments with reference to the attached drawings.

BRIEF DESCRIPTION OF THE DRAWINGS

FIGS. 2A and 2B are diagrams illustrating an operation waveform of the basic power supply apparatus according to the first embodiment.

FIGS. 2C, 2D and 2E are diagrams illustrating displacement of a transformer.

FIGS. 6A, 6B and 6C are diagrams illustrating a relationship between the displacement amount of the transformer and an added pulse according to the first embodiment.

FIGS. 8A, 8B, 8C and 8D are diagrams illustrating operation waveforms of the power supply apparatus according to the first embodiment.

FIG. 10A illustrates a circuit diagram of the power supply apparatus according to the second embodiment.

FIGS. 10B, 10C, 10D and 10E are diagrams illustrating an operation waveform of a power supply apparatus according to a third embodiment.

DESCRIPTION OF THE EMBODIMENTS

Preferred embodiments of the present invention will now be described in detail in accordance with the accompanying drawings.

The present invention is made based on a mechanism that electromagnetic force generated in association with the drive of a transformer gives a mechanical strain to the transformer, the mechanical strain propagates and resonates through the transformer, and a sound is emitted. In the present invention, a pulse for driving the transformer is provided at a predetermined timing of canceling out the mechanical strain generated by driving the transformer, thereby reducing the generation of a groaning sound of the transformer. The present invention proposes a drive method that can cancel out the groaning sound of the transformer by a small number of times of switching. In the present invention, a drive waveform that effectively suppresses the groaning sound of the transformer is provided, and a switching power supply apparatus can be highly efficiently operated. Hereinafter, modes for carrying out the present invention will be described in detail in embodiments, with reference to the drawings.

First Embodiment

Configuration and Operation of Basic Power Supply Apparatus

Figure 1A:
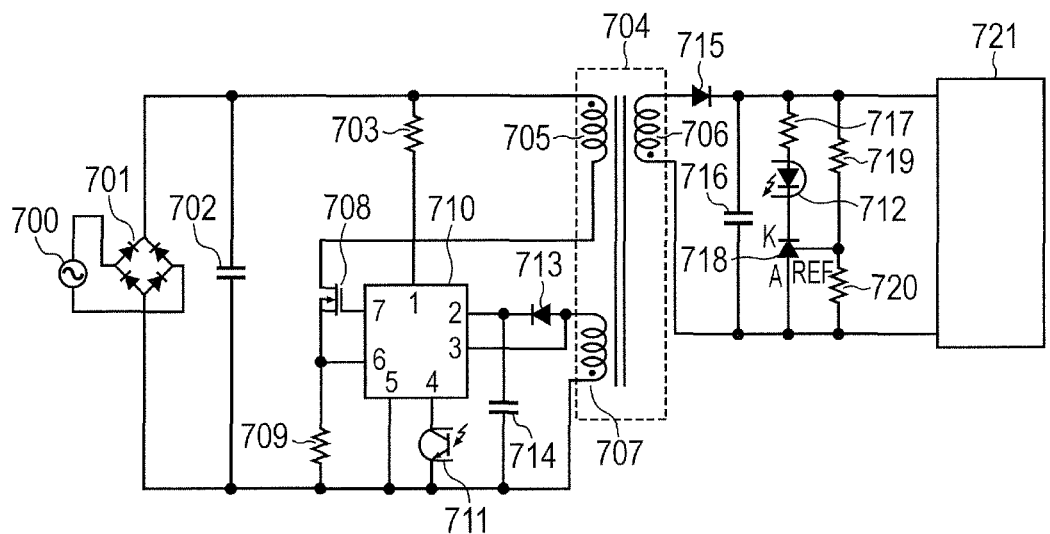
FIGS. 1A and 1B are a diagram illustrating a configuration of a basic power supply apparatus according to a first embodiment and a circuit diagram inside of an IC.

In relation to operation of a power supply apparatus, a configuration of the power supply apparatus will be described with reference to FIGS. 1A and 1B. When a commercial AC power supply 700 applies an AC voltage, a diode bridge 701 and a capacitor 702 rectify and smooth the AC voltage, and a DC voltage is generated at both ends of the capacitor 702. The voltage stored in the capacitor 702 is input, through a resistor 703, to a terminal 1 of a switching power supply control IC 710 (hereinafter, simply "IC 710") that is a control unit or a first control unit. As a result, a power supply circuit 802 inside of the IC 710 generates a power supply for the operation of the IC 710.

Figure 1B:
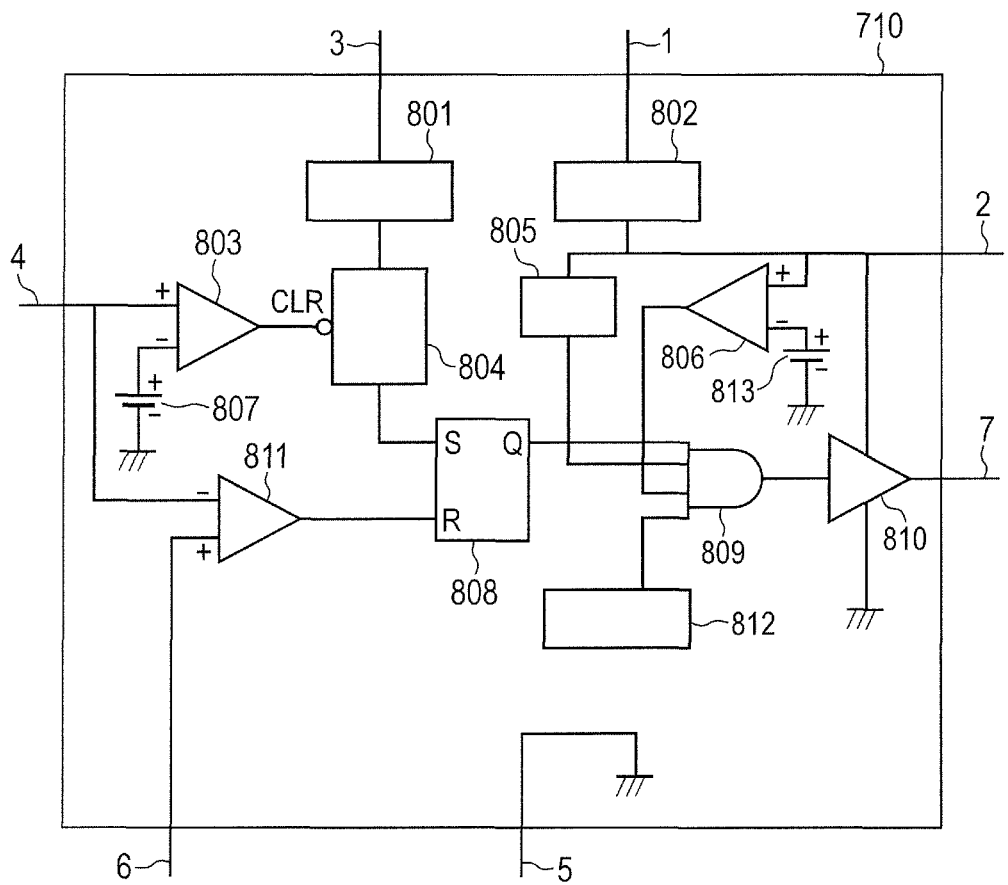

As illustrated in FIG. 1B, the IC 710 includes terminals 1 to 7. The IC 710 also includes a voltage detection circuit 801, an error amplifier 803, a one-shot circuit 804, a reference voltage generation circuit 805 and an error amplifier 806. The IC 710 further includes reference voltages 807 and 813, a flip flop 808, a multiple input AND 809, an output driver circuit 810, an error amplifier 811 and a protection circuit 812. The terminal 5 of the IC 710 is a GND terminal. The power supply circuit 802 receives a high voltage to supply power inside of the IC 710 and to supply voltage to the terminal 2 and has a function of cutting off the terminal 1 when the voltage of the terminal 2 rises. The reference voltage 807 is set to an oscillation stop voltage 902 described later.

The IC 710 sets the voltage of the terminal 7 of the IC 710 to a high level and turns on a field-effect transistor (hereinafter, simply "FET") 708 that is a switching unit or a first switching unit. The FET 708 is turned on or off to supply or block the current flowing through a primary winding 705 of a transformer 704. When the FET 708 is turned on, the current flows from the capacitor 702 to the primary winding 705 of the transformer 704, the FET 708 and a resistor 709. The transformer 704 includes the primary winding 705 wound around the transformer 704, a secondary winding 706 wound around in the opposite direction of the primary winding 705, and an auxiliary winding 707 wound around in the same direction as the secondary winding 706.

When the current flows through the resistor 709 to increase the voltage at both ends of the resistor 709, the voltage of the terminal 6 of the IC 710 rises. The resistor 709 functions as a current detection resistor. The IC 710 compares the voltages of the terminals 4 and 6 through the error amplifier 811. When the voltage of the terminal 6 is higher than the voltage of the terminal 4, the IC 710 sets the voltage of the terminal 7 to a low level and turns off the FET 708. When the FET 708 is turned off, the current flows from the secondary winding 706 of the transformer 704 to a diode 715 and a capacitor 716. The capacitor 716 is charged, and the voltage rises. The voltage of the auxiliary winding 707 of the transformer 704 rises, and the current flows from the auxiliary winding 707 to a diode 713 and a capacitor 714 to supply the voltage to the terminal 2 of the IC 710. When the current flows from the secondary winding 706 and the auxiliary winding 707 of the transformer 704, and there is no more energy stored in the transformer 704, the voltage of the secondary winding 706 and the auxiliary winding 707 of the transformer 704 starts free vibrations. The IC 710 monitors the vibrations of the voltage of the auxiliary winding 707 through the voltage detection circuit 801 connected to the terminal 3. When the voltage of the terminal 3 is the lowest, the IC 710 switches the terminal 7 to the high level to turn on the FET 708.

Repetition of such a series of operation increases the voltages of the capacitor 714 connected to the terminal 2 of the IC 710 and the capacitor 716 connected to a secondary side of the transformer 704. Resistors 719 and 720 divide the voltage of the capacitor 716, and the voltages are applied to a REF terminal of a shunt regulator 718. When the voltage applied to the REF terminal of the shunt regulator 718 is high, the current starts to flow between a cathode (K) and an anode (A) of the shunt regulator 718. As a result, the current flows to an LED 712 of a photocoupler through a resistor 717, and the current flows to a phototransistor 711 of the photocoupler. The voltage of the terminal 4 of the IC 710 drops.

As described, the IC 710 compares the voltages of the terminals 4 and 6 through the error amplifier 811. When the voltage of the terminal 6 is higher than the voltage of the terminal 4, the terminal 7 of the IC 710 is set to the low level. Therefore, when the voltage of the capacitor 716 rises, the IC 710 performs constant voltage control of reducing the ON time of the FET 708 to stabilize the output voltage. Since the auxiliary winding 707 is wound around in the same direction as the secondary winding 706, a voltage corresponding to a turn ratio is generated with respect to the voltage of the secondary winding 706. When the voltage of the capacitor 716 on the secondary side becomes stable, the voltage of the capacitor 714 also becomes a stable constant voltage.

When the electric power consumed by a load 721 drops, the voltage at both ends of the capacitor 716 rises. Therefore, the IC 710 reduces the ON time of the FET 708 to reduce the amount of charge of the capacitor 716 to lower the output voltage. When the output voltage drops, the time that the energy is emitted from the secondary winding 706 (also called discharge time) is also reduced. Therefore, the OFF time of the FET 708 is reduced, and the switching frequency rises. The IC 710 sets an upper limit in the frequency of repeating the high level and the low level of the terminal 7, i.e. switching frequency. When the load 721 stops using the current, i.e. consumed power is reduced, and the switching frequency reaches the upper limit, the IC 710 starts operation (hereinafter, called "burst operation") of skipping the switching operation to increase the OFF time. Hereinafter, a state of consuming predetermined electric power to perform the switching operation will be called a normal operation mode that is a first mode. Meanwhile, a state that electric power lower than in the normal operation mode is consumed to perform the burst operation of stopping the switching operation will be called a burst mode that is a second mode.

[Burst Operation by IC 710]

FIGS. 2A and 2B illustrate an example of the burst operation performed by the IC 710 and illustrate an operation waveform in the burst operation. In FIGS. 2A and 2B, the horizontal axis indicates time (t), and the vertical axis indicates voltage (V). A dashed line in FIG. 2A denotes a voltage waveform 901 of the terminal 4 of the IC 710. An alternate long and short dash line denotes an oscillation stop voltage 902 (reference voltage 807) set in advance in the IC 710. Solid lines of FIG. 2A denote voltage 903 between the terminals 6 at both ends of the resistor 709 in a state that the current is flowing. Solid lines of FIG. 2B denote voltage 904 of the gate terminal of the FET 708 which is also the voltage of the terminal 7 of the IC 710.

When the voltage of the terminal 4 changes as illustrated by the dashed line 901 and becomes lower than the oscillation stop voltage 902, the IC 710 operates to stop the output of pulse to the terminal 7. When the electric power consumed by the load 721 is reduced, the output voltage increases, and the voltage divided by the resistors 719 and 720 and input to the REF terminal of the shunt regulator 718 rises. Since the shunt regulator 718 applies more current between the cathode (K) and the anode (A), the current of the LED 712 of the photocoupler increases, and the voltage of the terminal 4 of the IC 710 connected to the phototransistor 711 of the photocoupler drops. As a result, the voltage of the terminal 4 of the IC 710 changes as illustrated by the dashed line 901, and the voltage becomes lower than the oscillation stop voltage 902. Consequently, the IC 710 stops the output of pulse from the terminal 7.

Even if the consumed power in the load 712 is reduced, the current for the detection in the power supply apparatus continues to flow. Therefore, the voltage stored in the capacitor 716 drops with a lapse of time, and the REF voltage of the shunt regulator 718 drops. The current between the cathode (K) and the anode (A) is reduced. As a result, the current of the LED 712 of the photocoupler and the current of the phototransistor 711 are reduced. When the voltage of the terminal 4 rises and becomes higher than the oscillation stop voltage 902 that is higher than a predetermined voltage, the IC 710 starts the output of pulse from the terminal 7 again. In this way, the IC 710 can perform the burst operation of preventing the switching frequency from rising when the load is light, and high efficiency is realized even in the light-load operation.

[Force Acting on Cores of Transformer]

FIGS. 2C to 2E illustrate diagrams defining directions of force acting on cores in the drive of the transformer 704 and illustrate diagrams indicating a displacement amount. It is assumed here that the cores of the transformer 704 are cores generally known as an EE type or an EER type. Each of the EE type core or the EER type of core includes two opposing core members 7041 and 7042. The primary winding 705, the secondary winding 706, and the auxiliary winding 707 are wound around the opposing core members 7041 and 7042. The opposing core members 7041 and 7042 have the same shape. The shape of an opposing core member 7041a will be described as a representative example. The opposing core member 7041 includes three cores. The three cores include the center core member 7041a and two side core members 7041b and 7041c on both sides of the center core member 7041a, extending parallel to the center core member 7041a. The edges of the center core member 7041a and the two side core members 7041b and 7041c on the same side are connected by one connection core 7041d extending perpendicular to the core members 7041a, 7041b and 7041c. A center core member 7042a, side core members 7042b and 7042c, and a connection core 7042d of the opposing core member 7042 are in the same positional relationship. The opposing core members 7041 and 7042 are arranged to connect ends of the side core members 7041b and 7042b with ends of the side core members 7041c and 7042c. In this condition, the center core members 7041a and 7042a of the opposing core members 7041 and 7042 are positioned on the same line to keep a predetermined gap distance between the opposing center core members 7041a and 7042a. FIGS. 2C to 2E illustrate schematic diagrams viewed from a direction perpendicular to axes of the cores of the transformer 704. In FIGS. 2C to 2E, arrows indicate directions of action of magnetic force generated in coils. As illustrated in FIG. 2C, a direction to attract the cores of the opposing core members 7041 and 7042 with each other in a winding axis direction, in which the winding is wound, is a + direction. As illustrated in FIG. 2D, a direction to move the cores of the opposing core members 7041 and 7042 away from each other is a − direction. FIG. 2E illustrates changes in the shapes of the opposing core members 7041 and 7042 of the transformer 704 in a vibration state due to a change in the magnetic force. As illustrated in FIG. 2E, the opposing center core members 7041a and 7042a are not in contact with each other. Therefore, in a state that the force in the − direction (restoring force F' described later) is dominant as illustrated in FIG. 2D, the centers of the connection cores 7041d and 7042d expand outside (vertical direction in FIGS. 2C to 2E) in the transformer 704, and the side core members 7041b, 7041c, 7042b and 7042c are recessed inside (horizontal direction in FIGS. 2C to 2E). Conversely, in a state that the force in the + direction (electromagnetic force F described later) illustrated in FIG. 2C is dominant, the transformer 704 is recessed in the axial direction (vertical direction in the drawings) of the center core members 7041a and 7042a and the side core members 7041b, 7041c, 7042b and 7042c and is expanded in the perpendicular direction (horizontal direction in the drawings) of the axial direction of the center core members 7041a and 7042a and the side core members 7041b, 7041c, 7042b and 7042c, although not illustrated in FIGS. 2A to 2E.

The current flows through the primary winding 705, the secondary winding 706 and the auxiliary winding 707 to generate electromagnetic force in the direction (+ direction) to attract the cores of the transformer 704 with each other. The magnitude of the electromagnetic force is proportional to the magnitude of the current flowing through the windings. Therefore, in a period that the FET 708 is turned on for example, the current flowing through the primary winding 705 generates the electromagnetic force, and the electromagnetic force continues to increase until just before the FET 708 is turned off. The FET 708 is turned off, and the electromagnetic energy stored in the transformer 704 starts to flow out from the secondary winding 706 and the auxiliary winding 707. Since the current of the auxiliary winding 707 is minute, the description will be skipped.

An initial value of the current flowing through the secondary winding 706 is a peak value of the current flowing through the primary winding 705 multiplied by a turn ratio. The current flowing through the secondary winding 706 is determined from the output voltage of the transformer 704, the inductance of the secondary winding 706 and the time from the turn-off of the FET 708, and the current value decreases with time. The electromagnetic force from the secondary winding 706 also works as attraction force, and the magnetic force generated by the current of the primary winding 705 increases with time. However, the electromagnetic force of the secondary winding 706 decreases with a decrease in the current and becomes 0 when the emission of the energy of the transformer 704 is finished.

The electromagnetic force F can be generally expressed by the following expression, and the electromagnetic force F is proportional to the magnetic flux density generated at the cores.

$$F \geq B^2 S/2\mu_0 \quad \text{(Expression 1)}$$

Here, B denotes a magnetic flux density, S denotes an effective cross-sectional area, and $\mu_0$ denotes a vacuum magnetic permeability.

It can be recognized that the magnetic flux density B is proportional to the current based on the following expression.

$$B = LI/SN \quad \text{(Expression 2)}$$

Here, L denotes an inductance of the transformer 704, I denotes a winding current, S denotes an effective cross-sectional area of a magnetic path, and N denotes the number of turns.

The displacement amount of the cores of the transformer 704 is small just after the application of current to the primary winding 705 of the transformer 704. The direction of the action of the electromagnetic force F is a direction to attract the cores with each other, i.e. arrow direction of FIG. 2B, and the direction will be defined as a + direction. The velocity of the cores is proportional to the integration of the electromagnetic force F. The velocity of the cores denotes an amount of change in the displacement of the cores per unit time. While the electromagnetic force F acts on the cores, the velocity of the cores increases in the + direction. Since the integration of the velocity of the cores leads to the displacement of the cores, the velocity of movement of the cores of the transformer 704 increases with time, and the displacement also increases in the + direction. The FET 708 is turned off, and the current of the primary winding 705 stops. The current flows through the secondary winding 706, and the current of the secondary winding 706 becomes 0 with a lapse of time. The FET 708 performs the next turn-off, and the current flows through the primary winding 705 again. Consequently, the electromagnetic force F becomes strong again, and this increases the velocity of the cores that is an integration of the acceleration provided to the cores and the displacement of the cores in the + direction that is a double integration of the acceleration. When the displacement of the cores becomes large, the restoring force caused by the elasticity of the cores of the transformer 704 cannot be ignored.

The restoring force F' due to the elasticity of the cores is as follows.

$$F' = -kx \quad \text{(Expression 3)}$$

Here, a spring constant k is obtained by material and structure of the cores, and x denotes a displacement amount from the resting time of the cores. The restoring force F' is proportional to the magnitude of the displacement amount x, and the restoring force F' acts in a direction to cancel out the displacement amount x.

(State of Cores in Burst Mode)

When the displacement of the cores increases, an increase in the restoring force F' starts to suppress an increase in the acceleration and the velocity of the cores, and sooner or later, the restoring force F' is balanced with the electromagnetic force F. When the power supply apparatus enters an idle period by shifting to the burst mode that is the second mode of performing the burst operation, the electromagnetic force F acting on the transformer 704 becomes 0. In this case, the potential energy caused by the displacement amount x and the restoring force F' as well as the kinetic energy caused by the velocity of the cores remain as dynamic energy of the cores. As a result, the cores start dynamic free vibrations. FIGS. 3A to 3D illustrate this state. The vertical axis of FIG. 3A indicates a waveform of gate voltage (V) of the FET 708, and the horizontal axis indicates time. The vertical axis of FIG. 3B indicates magnetic flux density B(T) of the magnetic flux generated in the cores, and the horizontal axis indicates time. The vertical axis of FIG. 3C indicates a displacement amount x of the cores, and the horizontal axis indicates time. The vertical axis of FIG. 3D indicates velocity of the cores in the + and − directions. The + direction indicates a direction to attract the cores of the transformer 704 with each other in the center direction, and the − direction indicates a direction to move the cores of the transformer 704 away from each other. The horizontal direction indicates time.

Figure 3A:
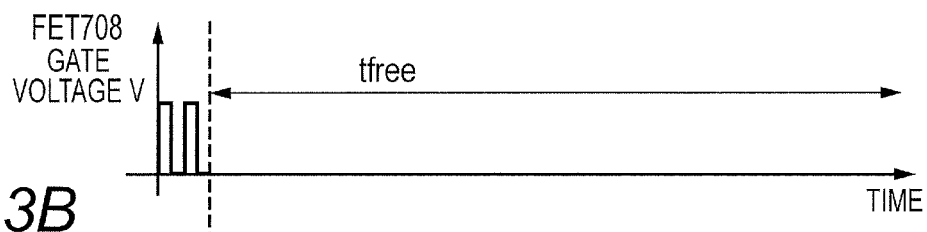
FIGS. 3A, 3B, 3C and 3D are diagrams illustrating a relationship between a displacement amount of the transformer and a pulse according to the first embodiment.
Figure 3B:
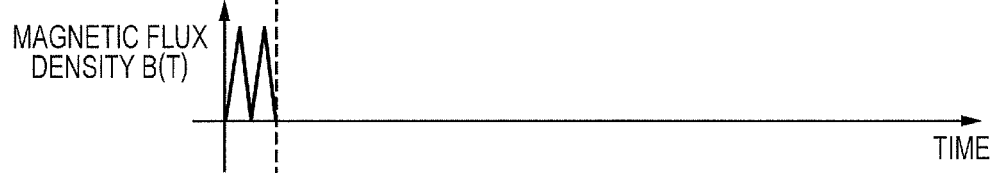
Figure 3C:
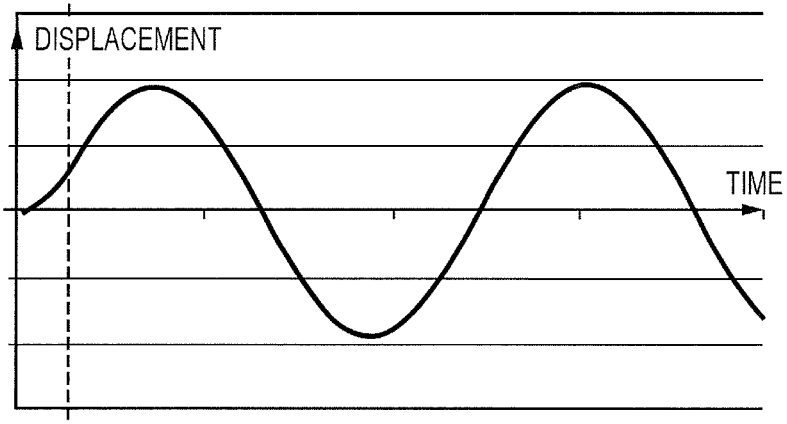
Figure 3D:
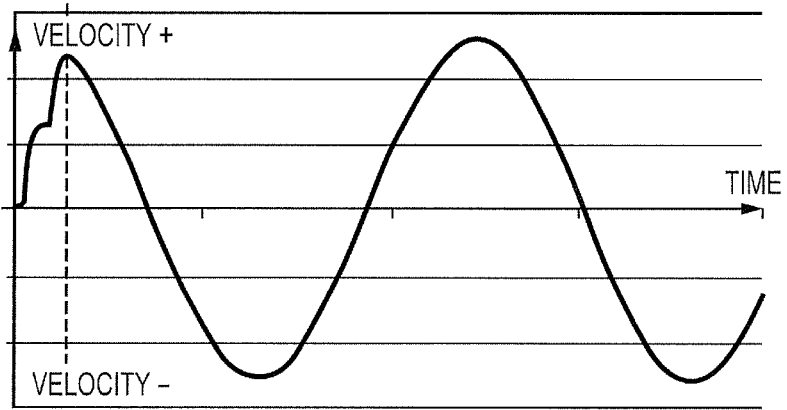

As illustrated in FIG. 3A, ON and OFF pulses of the FET 708 for driving the transformer 704 are applied twice. Due to the electromagnetic force F associated with the application of the pulses twice, the cores receive the acceleration twice as illustrated in FIG. 3D, and the velocity rises. The velocity of the cores is in the + direction which is a direction to attract the cores of the transformer 704 with each other. When the displacement amount in this case is viewed, the displacement of the cores is started along with the acceleration by the application of the pulses as illustrated in FIG. 3C. Even after the stop of the second pulse, the kinetic energy of the cores is converted to the potential energy of the spring constant, which is determined by the cores and the structure, and the displacement amount x. The following is obtained by the energy conservation law of the kinetic energy and the potential energy.

$$mv^2/2 - F'x = \text{constant} \quad \text{(Expression 4)}$$

Here, m denotes mass of cores, and v denotes velocity of cores.

Since the displacement is a result of the integration of the velocity, it can also be recognized that the phase of the displacement and the velocity is shifted by 90° (FIGS. 3C and 3D). It can also be recognized that after the electromagnetic force F becomes 0 (area on the right side of the vertical dashed line in FIGS. 3A to 3D), the velocity v and the displacement amount x of the cores start to vibrate like a sine wave due to the restoring force F' associated with the displacement (area indicated by "tfree" in FIG. 3A). There is always a loss in the actual transformer 704, and the sine wave vibration of the velocity v and the displacement x of the cores is attenuated.

[Application of Pulse During Free Vibrations of Cores]

Figure 4A:
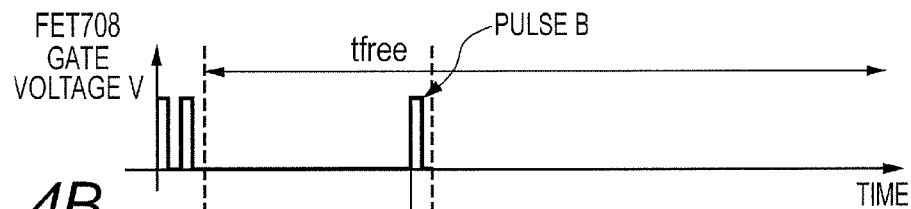
FIGS. 4A, 4B, 4C and 4D are diagrams illustrating a relationship between the displacement amount of the transformer and an added pulse according to the first embodiment.
Figure 4B:
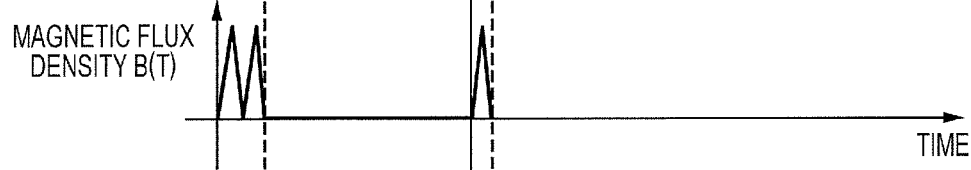
Figure 4C:
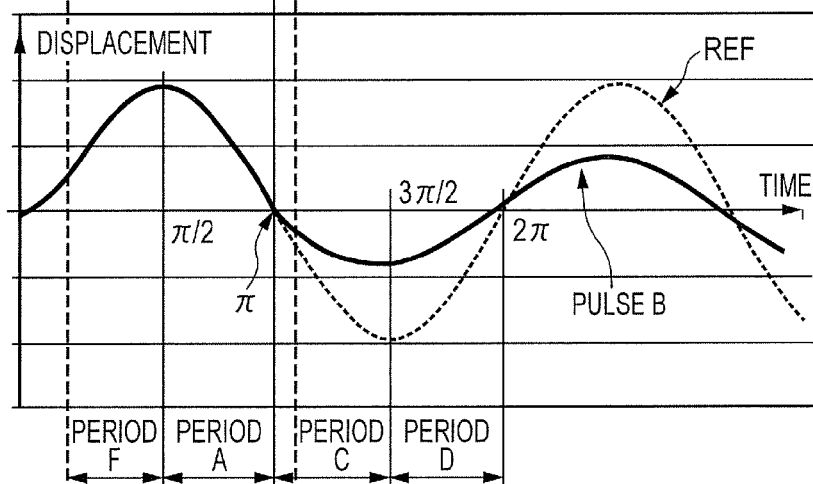
Figure 4D:
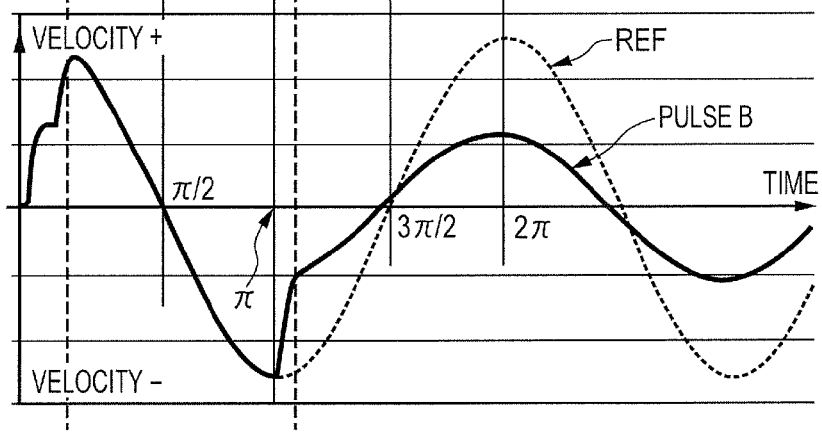

FIGS. 4A to 4D are graphs when a pulse for resetting the displacement amount of the cores is input to the FET 708 in the operation of the power supply apparatus in the burst mode (i.e. in the idle period of the switching operation). FIGS. 4A to 4D illustrate relationships between the pulse application timing and the displacement amount x and between the pulse application timing and the velocity v of the cores. To facilitate the description, FIGS. 4A to 4D illustrate an example in which one cycle of free vibrations (also called "basic vibration cycle") of the cores of the transformer 704 is $2\pi$, and a pulse is applied once after a lapse of $\pi$ that is a half cycle of the basic vibration cycle $2\pi$. FIG. 4A illustrates a waveform of the gate voltage (V) of the FET 708. FIG. 4B illustrates the magnetic flux density B(T) of the cores. FIG. 4C illustrates the displacement amount x of the cores. FIG. 4D illustrates the velocity v of the cores. All of the horizontal axes indicate time. FIGS. 4C and 4D describe dashed lines REF illustrating waveforms indicating the free vibrations (tfree) of the cores from the attenuation of the electromagnetic force F. Therefore, the waveforms of the dashed lines REF illustrated in FIGS. 4C and 4D are the same as the waveforms of FIGS. 3C and 3D.

(Pulse B)

In FIGS. 4A to 4D, the ON and OFF pulses of the FET 708 for driving the transformer 704 are applied twice, as in FIGS. 3A to 3D. The start timing of the free vibrations (tfree) of the cores is a timing of the magnetic flux density B(T)=0 after the application of the second pulse to the FET 708 as illustrated in FIG. 4B. Hereinafter, the timing that the displacement amount of the cores becomes 0 for the first time minus the time equivalent to the phase π (hereinafter, simply expressed as "time π", etc.) when the cycle of the free vibration of the cores is 2π will be referred to as time 0.

At a timing after the time π from the time 0, the velocity v of the cores is the maximum in the direction to move the cores away from each other (− direction), and the displacement amount x of the cores is substantially 0. Therefore, the kinetic energy is dominant (x=0) as for the dynamic energy of the cores. When a pulse is applied at a timing of the time π to provide the electromagnetic force F as in a pulse B of FIG. 4A, the amplitude of the velocity v of the cores decreases as in the waveform indicating the pulse B by a solid line of FIG. 4B (therefore, absolute value of the velocity v is reduced). In this way, the application of the pulse to the gate terminal of the FET 708 at the timing of the time π results in a rapid deceleration in the velocity v of the cores. Since the potential energy of the cores is substantially 0, the vibration is performed only by the remaining kinetic energy. As illustrated by the waveforms of the pulse B in the solid lines of FIGS. 4C and 4D, it can be recognized that the amplitude of the displacement amount x and the amplitude of the velocity v are reduced after the application of the pulse. To simplify the following description, a period from time π/2 to time π will be referred to as a period A, and a period from time π to time 3π/2 will be referred to as a period C. A period from time 3π/2π to time 2π will be referred to as a period D, and a period from the timing that the electromagnetic force F is (or magnetic flux density B=0) to time π/2 will be referred to as a period F.

Figure 5A:
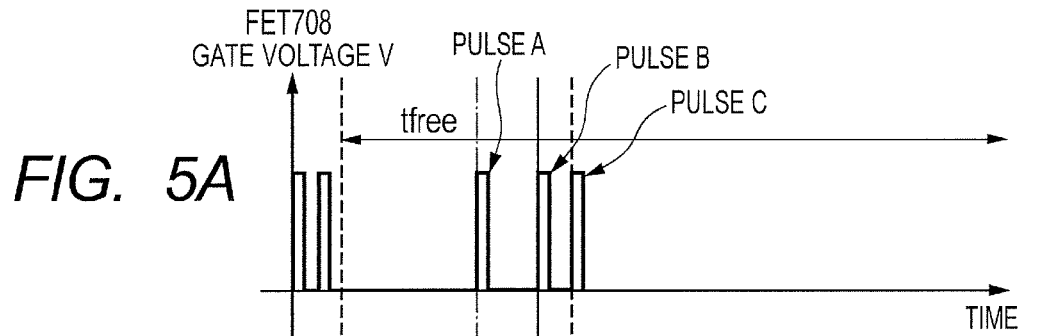
FIGS. 5A, 5B and 5C are diagrams illustrating a relationship between the displacement amount of the transformer and an added pulse according to the first embodiment.
Figure 5B:
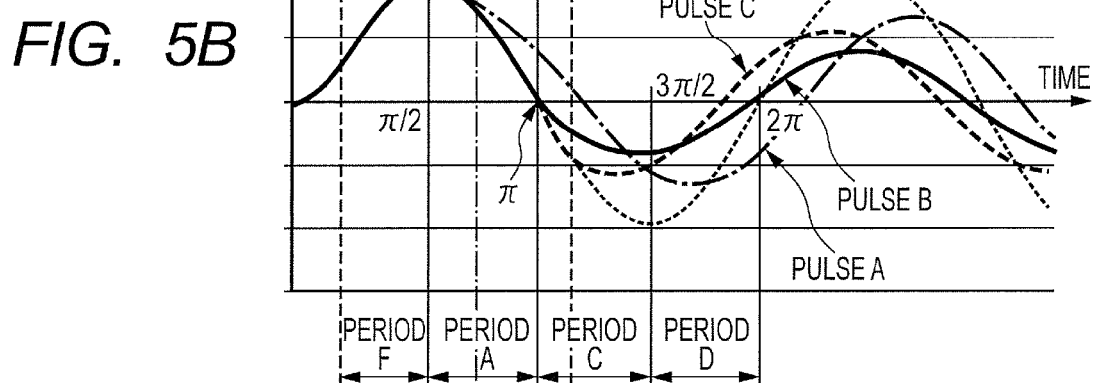
Figure 5C:
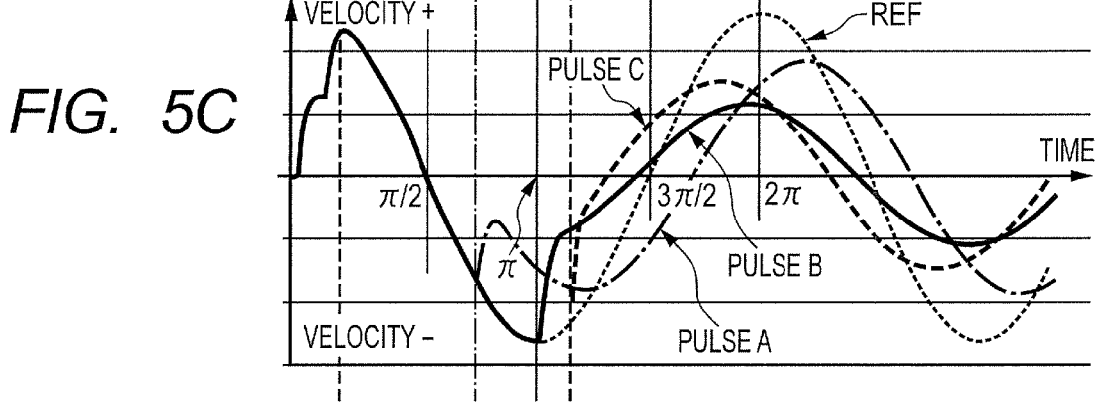

FIGS. 5A to 5C and FIGS. 6A to 6C illustrate the displacement amount x and the velocity v when the timing of applying the pulse to the gate terminal of the FET 708 is changed to a timing different from the timing of the pulse B of FIGS. 4A to 4D during the free vibrations of the cores of the transformer 704. FIGS. 5A to 5C and FIGS. 6A to 6C are graphs corresponding to FIGS. 4A, 4C and 4D, respectively, and the graphs will not be described. FIGS. 5B, 5C, 6B and 6C also illustrate the dashed lines REF indicating the waveforms of the free vibrations (tfree) of the cores after the attenuation of the electromagnetic force F. As described, the electromagnetic force F generated by applying the pulse to the FET 708 acts only in the direction to attract the cores with each other (direction in which the displacement amount is +), and the velocity v can be increased only in the + direction of the graph. Therefore, the vibrations of the cores may be large or small depending on the timing of the pulse applied after the shift to the burst mode. FIGS. 5A to 5C illustrate the displacement amount x and the velocity v when the pulse is applied once at each timing of the period A, the time π and the period C. The pulse applied in the period A is a pulse A, the pulse applied at the timing of the time π is a pulse B, and the pulse applied in the period C is a pulse C.

FIGS. 6A to 6C illustrate the displacement amount x and the velocity v when the pulse is applied once at each timing of the period D, around the time 2π, and the period F. In FIGS. 6A to 6C, the pulse applied in the period D is a pulse D, the pulse around the time 2π is a pulse E, and the pulse applied in the period F is a pulse F. The pulse E around the time 2π is a pulse output in a period after 3π/2 and before π/2 of the next cycle (can also be referred to as 3π/2 to 5π/2), and in the present embodiment, the pulse E is output at a timing closer to the time 2π than the pulse D.

(Pulse A and Pulse C)

In the period from the time π/2 to the time 3π/2, i.e. periods A to C, the cores move substantially in the direction to move the cores of the transformer 704 away from each other (− direction), i.e. velocity v is negative. Therefore, the acceleration caused by the electromagnetic force F works as a brake in the periods A to C, and it can be recognized that the absolute value of the velocity v is small. For example, as illustrated in FIGS. 5B and 5C, the absolute value of the velocity v is small in the pulse A (illustrated by a thick alternate long and short dash line) applied in the period A. When the pulse A is applied in the period A, the potential energy based on the displacement amount x and the spring constant k remains. Therefore, after temporary reduction in the velocity v, the absolute value of the velocity v rises again due to the acceleration based on the restoring force F'. As illustrated in FIGS. 5B and 5C, the application timing of the pulse B (illustrated by a thick solid line) is the same as the timing in FIGS. 4A to 4D and is a timing with the displacement amount 0 and the maximum velocity (− direction). In this case, the restoring force F' associated with the magnitude of the displacement amount x is reduced, and the remaining kinetic energy changes to the potential energy after the reduction in the absolute value of the velocity v. Therefore, the amplitude of the velocity v and the amplitude of the displacement amount x are the smallest in the pulse B. In the pulse C (illustrated by a thick dashed line) applied in the period C illustrated in FIGS. 5B and 5C, the absolute value of the velocity v is reduced, but the energy already converted to the potential energy remains. Therefore, it can be recognized that the effect is small compared to the pulse B. In the period C, when the velocity v is on the + side as a result of providing the electromagnetic force F by the pulse application, the amplitude of the velocity v is rather large, and the amplitude of the displacement amount x is also large.

(Pulse D, Pulse E and Pulse F)

In the periods from the time 3π/2 to the time 2π (period D) and from the timing of the magnetic flux density B=0 (see FIG. 3B) to the time π/2 (period F), the cores of the transformer 704 move in the direction (+ direction) to attract the cores with each other. Therefore, the application of the electromagnetic force F in this timing further increases the velocity v of the cores of the transformer 704 and increases the amplitude of the displacement amount x. Particularly, the effect is the maximum at the timing of the pulse E illustrated in FIGS. 6A to 6C. In FIGS. 6B and 6C, the waveforms of the displacement amount x and the velocity v when the pulse D is applied are indicated by thick alternate long and short dash lines. The waveforms of the displacement amount x and the velocity v when the pulse E is applied are indicated by thick solid lines. The waveforms of the displacement amount x and the velocity v when the pulse F is applied are indicated by thick dashed lines.

As described, the present embodiment is characterized by the configuration with the ON period of at least one wave in the period from the time π/2 to the time 3π/2 of the mechanical resonant period of the cores of the transformer 704 after the start of the burst mode that is the idle period of the switching operation. More specifically, the electromagnetic force F is provided at the timing of reducing the absolute value of the velocity v of the cores of the transformer 704. In this way, the vibration of the cores is suppressed. Although the period is from the time $\pi/2$ to the time $3\pi/2$ in the description, a period from $n \times \pi/2$ to $n \times 3\pi/2$ (n is an integer 1 or more) that can attain the same effect when the cycle of the mechanical vibration is $2\pi$ can be set. The unit that provides the electromagnetic force F and the unit that generates the timing are not limited to the configurations of the present embodiment. Although the present embodiment has described an example of a pseudo-resonant power supply, particularly called a critical mode, which is a flyback power supply, the present invention can be applied to a power supply apparatus that performs discontinuous operation, and the present invention is not limited by the power supply system and the control system of the IC.

[Configuration of Power Supply Apparatus]

Figure 7:
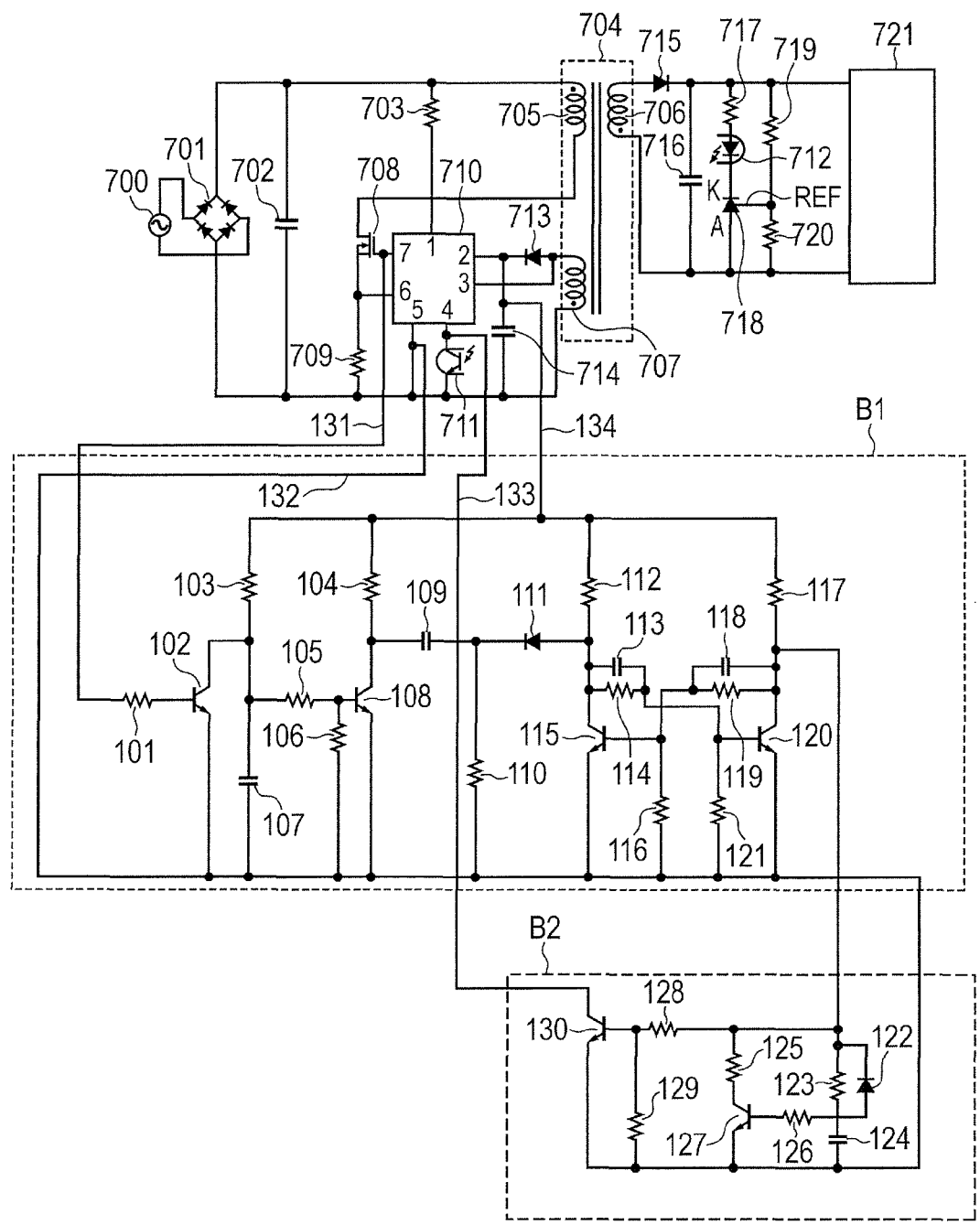
FIG. 7 is a circuit diagram of the power supply apparatus according to the first embodiment.

FIG. 7 is a circuit diagram of the power supply apparatus of the present embodiment. FIGS. 8A to 8D illustrate operation waveforms of the power supply apparatus of the present embodiment. The same reference numerals are provided to the configurations common to the circuit diagram of FIG. 1A, and the description will not be repeated. A terminal 131 is connected to the terminal 7 of the IC 710, i.e. gate voltage signal terminal of the FET 708. A terminal 132 is connected to the terminal 5 that is the GND terminal of the IC 710. A terminal 134 is connected to the terminal 2 of the IC 710 and is a power supply terminal. A terminal 133 is connected to a feedback terminal of the terminal 4 of the IC 710. The terminal 131 is connected to a one-shot circuit B1 described later, and the terminal 133 is connected to a timer circuit B2 described later.

The one-shot circuit B1 is a circuit that detects the stop of a signal for driving the gate terminal of the FET 708 to generate a one-shot pulse. The timer circuit B2 is a circuit that mandatorily stops the IC 710 for a certain time based on the one-shot pulse generated by the one-shot circuit B1.

When the IC 710 controls the FET 708 to perform the switching operation, a signal in a high level and a signal in a low level are alternately applied to the terminal 131 based on a signal applied to the gate terminal of the FET 708. Since the terminal 131 is connected to the base terminal of a transistor 102 of the one-shot circuit B1, the signal is input to the base terminal of the transistor 102 through a resistor 101, and the transistor 102 is periodically turned on and off. A capacitor 107 is periodically discharged by the transistor 102, and the voltage of the capacitor 107 is low.

On the other hand, when the power supply apparatus shifts to the burst mode, the terminal 7 of the IC 710 is held in the low level. In this way, when the signal of the low level is applied to the terminal 131 for a long time by the burst operation of the power supply apparatus, the transistor 102 is turned off, and the voltage of the capacitor 107 starts to rise. When the voltage of the capacitor 107 rises, a transistor 108 is turned on, and the collector terminal of a transistor 115 enters the low level through a diode 111. Transistors 115 and 120 form a one-shot circuit. When the diode 111 causes the collector terminal of the transistor 115 to enter the low level, the base of the transistor 120 enters the low level through a capacitor 113, and the transistor 120 is turned off. When the transistor 120 is turned off, the voltage of the collector terminal of the transistor 120 rises, and the voltage of the base terminal of the transistor 115 rises. The transistor 115 is turned on, and the voltage of the collector terminal of the transistor 115 is further reduced.

When the voltage of the collector terminal of the transistor 120 rises, a transistor 130 of the timer circuit B2 is turned on, and the terminal 133 connected to the collector terminal of the transistor 130 shifts the terminal 4 of the IC 710 to the low level. In this case, the current continues to flow through a capacitor 124 through a resistor 123. One end of the capacitor 124 is connected to the base terminal of a transistor 127 through a resistor 126. Therefore, when the time determined by the time constants of the resistor 123 and the capacitor 124 has passed, the transistor 127 is turned on, and the base terminal of the transistor 130 enters the low level. Therefore, the transistor 130 is turned off, and the terminal 4 of the IC 710 is released from the low level. In this way, when the power supply apparatus shifts to the burst mode, the one-shot circuit B1 and the timer circuit B2 hold the terminal 4 of the IC 710 in the low level until the time determined by the timer circuit B2 has passed. Reference numerals 103 to 106, 110, 112, 114, 116, 117, 119, 121, 125, 128 and 129 denote resistors. Reference numerals 109 and 118 denote capacitors, and reference numeral 122 denotes a diode.

[Operation Waveforms of Power Supply Apparatus]

FIGS. 8A to 8D illustrate operation waveforms of the power supply apparatus illustrated in FIG. 7. A dashed line 901 of FIG. 8A denotes a voltage waveform of the terminal 4 of the IC 710. An alternate long and short dash line 902 denotes an oscillation stop voltage (reference voltage 807 of FIG. 1B) that is a predetermined voltage set in advance in the IC 710. A solid line 903 denotes a voltage appearing at the resistor 709. Reference numeral 904 of FIG. 8B denotes a waveform of the gate voltage of the FET 708 based on the operation of the IC 710 and is a voltage of the terminal 7 (also the terminal 131) of the IC 710. Therefore, FIG. 8B also illustrates a pulse waveform applied to the gate terminal of the FET 708. Reference numeral 250 of FIG. 8C denotes a waveform of the collector voltage of the transistor 102 of the one-shot circuit B1, and reference numeral 251 of FIG. 8D denotes a base voltage of the transistor 130 of the timer circuit B2. The horizontal axis of FIGS. 8A to 8D denotes time (t), and the vertical axis denotes voltage (V).

The transistor 130 is turned on in a period toff that is a predetermined time in which the base voltage of the transistor 130 is higher than Vbe (about 0.6 V). Therefore, the voltage of the terminal 4 of the IC 710 is in a low level (0 V) in the period toff as illustrated by 901 of FIG. 8A. Thus, in the operation period of the timer circuit including the resistor 123, the capacitor 124, the resistors 125 and 126, and the transistor 127, the voltage of the terminal 4 of the IC 710 is lower than the oscillation stop voltage 902, and the IC 710 does not turn on the FET 708. As described, the period toff that is a period in which the transistor 130 is turned on is determined by the time constants of the resistor 123 and the capacitor 124.

Meanwhile, the time until the start of the turn-on of the transistor 130 is determined by the resistor 103, the capacitor 107, the resistor 105 and the transistor 108 of the one-shot circuit B1. The time until the transistor 130 is turned on and the time of the period toff are determined to be a period from $\pi/2$ to $3\pi/2$, wherein the resonant period of the cores of the transformer 704 is $2\pi$. As described in FIG. 4D, the period from $\pi/2$ to $3\pi/2$ is a period in which the velocity of the cores of the transformer 704 is in the − direction.

There is a plurality of methods of measuring the resonant period of the transformer 704, and the following are examples of the method.

(1) Hit the cores of the transformer 704 with a hammer to measure the sound in this state and acquire a frequency spectrum by a Fourier transform.

(2) Apply a sine wave to the transformer 704 to measure the generated sound wave while changing the frequency and acquire a frequency spectrum by a Fourier transform.

The peak of the frequency spectrum is checked by the method of (1) or (2), and a reciprocal of the lowest frequency component is obtained to set the reciprocal as the resonant period of the basic wave of the transformer 704.

The cycle is calculated from the frequency actually obtained by the method of (2), and the sound pressure is measured in a state in which one wave of pulse is applied after the time π from the end of the burst operation and in a state without the pulse. It can be confirmed that the sound pressure measured by using a microphone and an FFT analyzer decreases by 10 dB or more, despite the fact that larger electric power can be transmitted in the case with the pulse than in the case without the pulse.

According to the present embodiment, the sound generated from the transformer can be reduced, while reducing the switching loss in the power supply apparatus.

Second Embodiment

A circuit with a simplified power supply apparatus will be described in a second embodiment. The waveform of the gate voltage of the FET 708 of the power supply apparatus described in the first embodiment is about several μs to a little over ten μs including the ON time and the OFF time. The mechanical resonant frequency of the cores in the size of EER 28 to EER 42, which is a general size of the transformer 704, is several kHz to a little over ten kHz. Therefore, the time necessary for the period toff for holding the terminal 4 of the IC 710 in the low level (hereinafter, also called "mandatory off period") is about several dozen μs to one hundred and several dozen μs, which is sufficiently longer than the period of the switching operation of the FET 708. In such a case, the circuit can be simplified as in FIG. 9A.

[Configuration of Power Supply Apparatus]

Figure 9A:
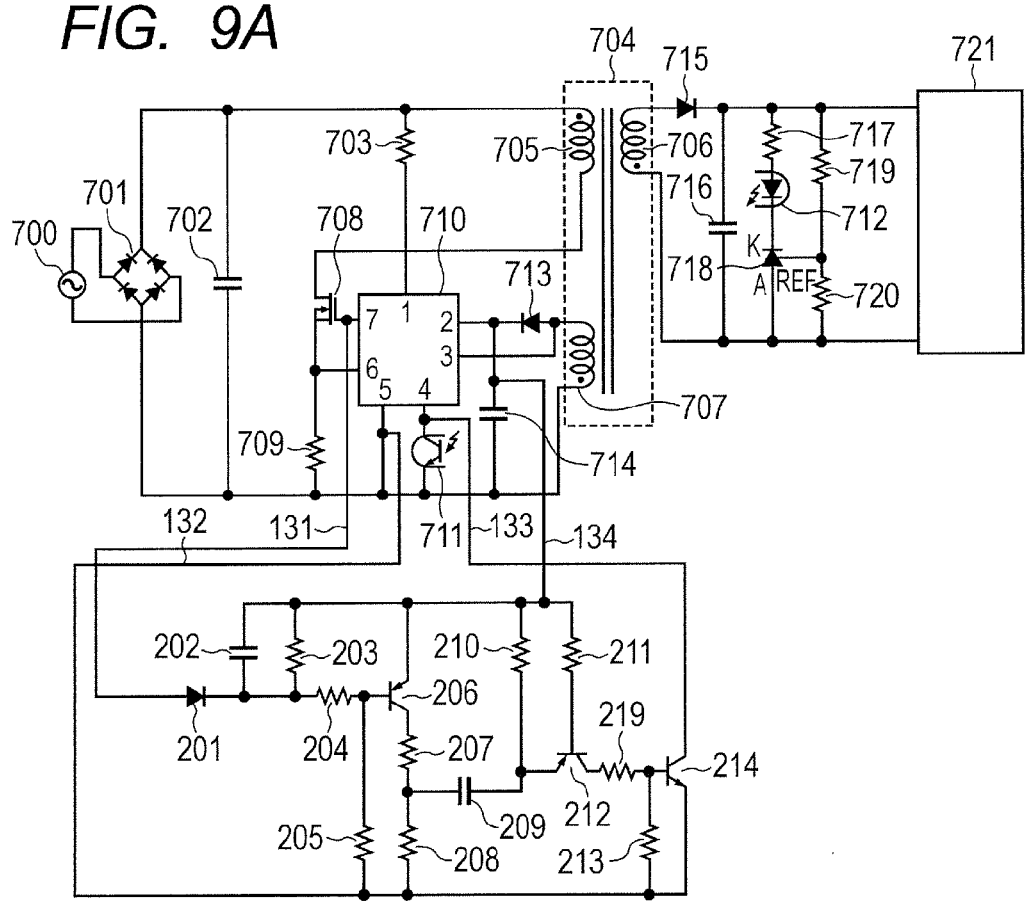
FIG. 9A illustrates a circuit diagram of a power supply apparatus according to a second embodiment.
Figure 9B:
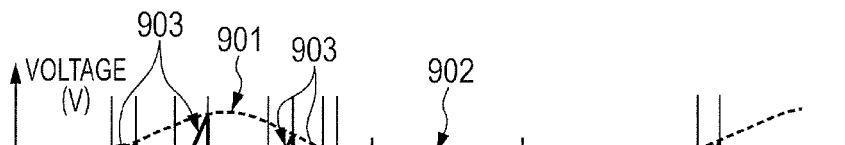
FIGS. 9B, 9C, 9D and 9E are diagrams illustrating operation waveforms of the power supply apparatus according to the second embodiment.
Figure 9C:
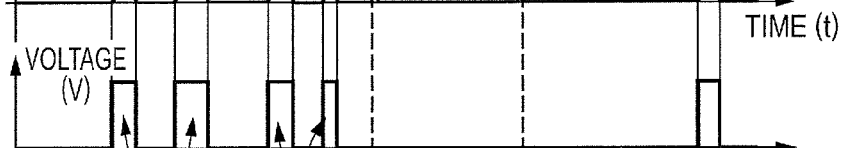
Figure 9D:
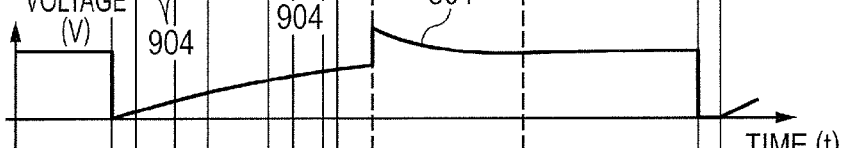
Figure 9E:
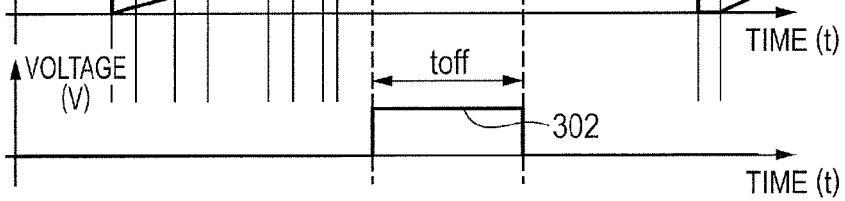

In the power supply apparatus illustrated in FIG. 9A, the one-shot circuit including the transistors 115 and 120 of FIG. 7 is omitted to simplify the circuit. A collector terminal of a transistor 214 is connected to the terminal 4 of the IC 710 through the terminal 133. The same effect can also be obtained by connecting the collector terminal of the transistor 214 to the resistor 709 or the terminal 6 of the IC 710 if the signal level is matched. The power voltage that is the terminal 134 may be acquired from the capacitor 714 common to the IC 710. FIGS. 9B to 9E illustrate waveforms of the components of the power supply apparatus illustrated in FIG. 9A. FIGS. 9B and 9C are the same graphs as the graphs of FIGS. 8A and 8B, and the description will not be repeated. Reference numeral 301 of FIG. 9D denotes an emitter voltage of a PNP transistor (hereinafter, simply called "transistor") 212, and reference numeral 302 of FIG. 9E denotes a base voltage of the transistor 214.

When the IC 710 turns on or off the FET 708, the power voltage of the IC 710 is generated between the terminal 2 of the IC 710 and the terminal 5 of the IC 710. The terminals 132 and 134 acquire the power voltage of the IC 710 generated between the terminals 2 and 5 to operate the circuit of the present embodiment. When the power voltage of the IC 710 is applied between the terminals 132 and 134, the voltage at both ends of the capacitor 202 rises, and a PNP transistor (hereinafter, simply called "transistor") 206 is turned off. When the consumed power of the load 721 on the secondary side of the power supply apparatus is large, and the IC 710 does not perform the burst operation, the transistor 206 is not turned on based on the time constants of the capacitor 202 and the resistors 204 and 205. Therefore, the transistor 214 is continued to be turned off.

On the other hand, when the consumed power of the load 721 on the secondary side of the power supply apparatus is reduced, and the IC 710 shifts to the burst mode, the time that the voltage of the gate terminal of the FET 708 is reduced is long. More specifically, the terminal 7 (also terminal 131) of the IC 710 is in the low level. The capacitor 202 is charged by the current flowing from the terminal 134 to the resistors 204 and 205, and the transistor 206 is turned on when the voltage of the capacitor 202 becomes large. When the transistor 206 is turned on, the current flows from the terminal 134 to a path of the transistor 206 and resistors 207 and 208, and the voltage of the terminal on the side of the resistor 208 of the capacitor 209 rises. Since the capacitor 209 is charged with the power voltage, the voltage on the side of the resistor 210 of the capacitor 209 is higher than the power voltage, and the transistor 212 is turned on. When the transistor 212 is turned on, the transistor 214 is turned on. The terminal 4 of the IC 710 is connected to the terminal 133. When the transistor 214 is turned on, the voltage of the terminal 4 is reduced as in the toff period of 901 illustrated in FIG. 9B. When the voltage of the terminal 4 is reduced below the predetermined oscillation stop voltage 902, the IC 710 continues to turn off the FET 708. Therefore, the FET 708 cannot be turned on in the toff period when the transistor 214 is turned on.

When the terminal voltage of the capacitor 209 is discharged in the path of the resistors 211 and 219, the transistor 214, and the resistor 213 through the resistor 210 and the transistor 212, the transistor 212 is turned off. When the transistor 212 is turned off, the transistor 214 is turned on again. Since the transistor 214 is turned off, the IC 710 mandatorily stops the oscillation when the discharge time of the capacitor 202 has passed after the application of the last pulse of the burst operation. The period of stopping the oscillation is a period of the discharge time constant of the capacitor 209. A diode 201 is designed to prevent the voltage from being applied from the terminal 131 to the gate terminal of the FET 708, and reference numeral 203 denotes a resistor.

In the power supply apparatuses illustrated in FIG. 7 of the first embodiment and FIG. 9A of the present embodiment, the circuits define the shortest period of the period from the stop of the oscillation in the burst mode to the start of the next oscillation. The OFF time in the burst mode changes based on the magnitude of the load. Specifically, when the load is large (i.e. load is heavy), and the flowing current is large, the OFF time is short. Therefore, when the actual oscillation stop period is shorter than the oscillation stop period set by the timer circuit due to the increase in the load 721 of the power supply apparatus and the reduction in the OFF time in the light-load operation, the cycle of the burst operation is fixed to the cycle of canceling out the vibrations of the transformer 704. In reality, a device (for example, a laser printer) that uses the power supply apparatus operates when the load 721 is large, and the generation of sound from the transformer 704 due to the operation sound of the device is hardly noticeable in many cases. On the other hand, the sound of the transformer 704 is noticeable in a sleep state in which the device does not operate, and the effect of reducing the sound of the transformer 704 is large. To mandatorily start the oscillation after the end of the oscillation stop period based on the timer circuit, the voltage of the terminal 4 can be greater than the oscillation stop voltage 902.

[Timing of Application of Pulse in Burst Operation]

FIG. 10A illustrates an example of forming a circuit (which is also a pulse application circuit) that turns on and off the FET 708 by outputting one wave of pulse to the FET 708 after the end of the oscillation stop period (period toff) based on the timer circuit including the diodes, the capacitors and the resistors. The same reference numerals are provided to the same configurations as in FIGS. 1A and 9A, and the description will not be repeated. FIGS. 10B to 10E illustrate operation waveforms of the components of the power supply apparatus illustrated in FIG. 10A. FIGS. 10B and 10C correspond to the graphs illustrated in FIGS. 9B and 9C, and the description will not be repeated. A pulse in the normal burst operation is applied to the FET 708 in FIG. 9C. On the other hand, FIG. 10C is different in that a pulse for canceling out the mechanical strain of the cores of the transformer 704 is applied to the FET 708 after the end of the period toff. Reference numeral 401 of FIG. 10D denotes a voltage waveform of the emitter terminal of the transistor 212, and reference numeral 402 of FIG. 10E denotes a waveform of the base voltage of the transistor 214.

In the power supply apparatus of FIG. 10A, the collector terminal of the phototransistor 711 of the photocoupler connected to the terminal 4 of the IC 710 in FIG. 9A is connected to a terminal 224. As a result of the connection, a capacitor 221 is charged in the period in which the transistor 214 is turned on. When the voltage of the emitter terminal of the transistor 212 rises, the transistor 214 is turned off, and the voltage stored in the capacitor 221 is applied to the terminal 4 of the IC 710.

As illustrated by 901 of FIG. 10B, the voltage stored in the capacitor 221 is applied to the terminal 133 when the transistor 214 is turned off, and the voltage of the terminal 4 of the IC 710 becomes higher than the oscillation stop voltage 902. As a result, the IC 710 outputs a signal in the high level from the terminal 7 to the FET 708, and the FET 708 is turned on. When the FET 708 is turned on, the current flows through the primary winding 705 of the transformer 704, and the voltage of the terminal 6 rises. When the voltage of the terminal 6 rises to the voltage of the terminal 4, the IC 710 turns off the FET 708. When the FET 708 is turned off, the current flows from the secondary winding 706 of the transformer 704 to the diode 715 and the capacitor 716, and the output current on the secondary side rises. Therefore, the shunt regulator 718 starts to flow the current between the cathode (K) and the anode A. The LED 712 of the photocoupler emits light, and the phototransistor 711 of the photocoupler flows more current to reduce the voltage of the terminal 4 through the resistor 223. In FIG. 10A, reference numeral 220 denotes a resistor, and reference numeral 222 denotes a diode. The capacity of the capacitor 221 is determined so that the voltage of the terminal 4 is higher than the oscillation stop voltage 902 when the stored voltage is applied to the terminal 4 of the IC 710.

In this way, when the ON and OFF operation of the FET 708 is stopped by the burst operation, the application of pulse to the FET 708 is prohibited for a certain period (i.e. period toff). Along with the prohibition of the application of pulse, at least a pulse of one wave can be applied after the end of the period toff.

According to the present embodiment, the sound generated from the transformer can be reduced, while reducing the switching loss in the power supply apparatus.

Third Embodiment

Figure 11A:
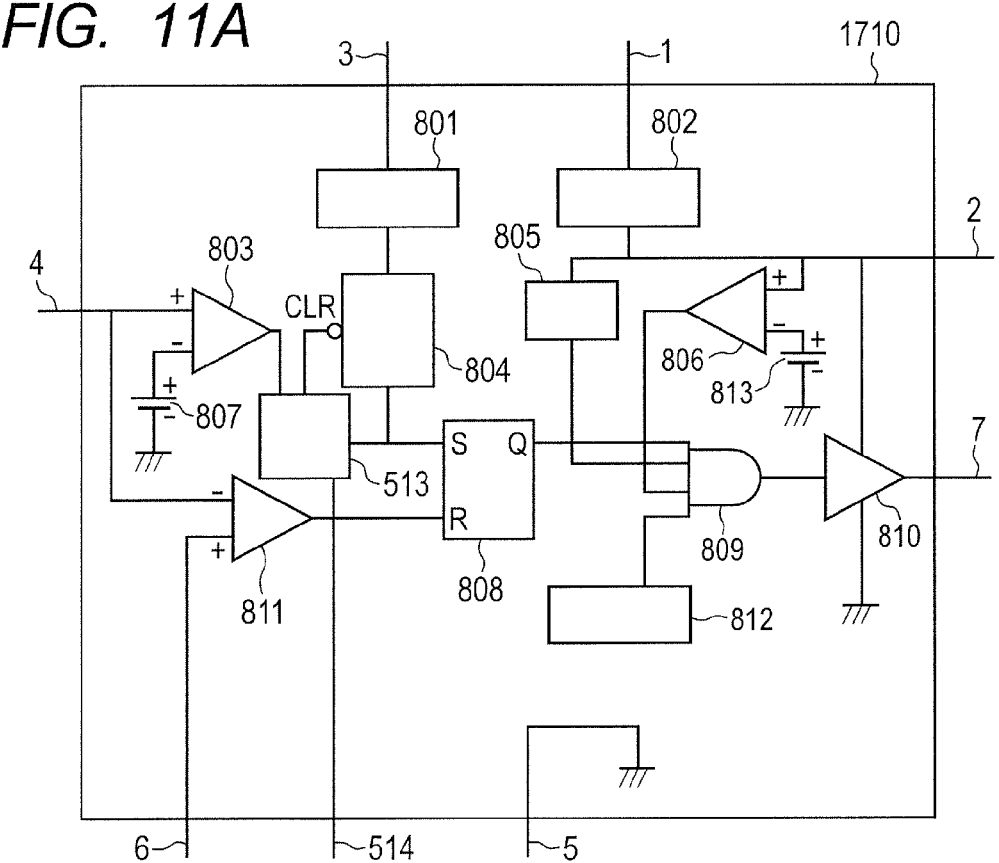
FIG. 11A illustrates a circuit diagram inside of an IC of a power supply apparatus according to a fourth embodiment.

In the first embodiment, an example of forming the one-shot circuit B1 and the timer circuit B2 by discrete circuits is described. In a third embodiment, an example of mounting the one-shot circuit B1 and the timer circuit B2 on an IC will be illustrated below. FIG. 11A illustrates an example of an internal circuit of an IC 1710. The one-shot circuit and the timer circuit can be easily mounted in the IC. The present embodiment will describe an example of applying the IC 1710 illustrated in FIG. 11A to the power supply apparatus of FIG. 1A.

In the IC 1710 of FIG. 11A, the same reference numerals are provided to the same functions as in the IC 710, and the description will not be repeated. A timer 513 with a control terminal and a control terminal 514 are added to the IC 710 in the internal circuit of the IC 1710 of FIG. 11A. Since the IC 1710 described in the present embodiment is based on the IC 710, a one-shot circuit 804 equivalent to the one-shot circuit B1 is already included. Therefore, only the timer 513 is added in the IC 1710 of the present embodiment. However, the present invention is not limited by the configuration of the IC.

The timer 513 is connected to the output of the error amplifier 803 and the CLR terminal of the one-shot circuit 804. The control terminal 514 of the IC 1710 allows controlling the time of the timer 513 from the outside. When the voltage of the terminal 4 of the IC 1710 becomes smaller than the oscillation stop voltage 807, the error amplifier 803 outputs a signal of a low level. When the low level is input to the timer 513, the timer 513 starts clocking operation and sets a CLR signal to be output to the one-shot circuit 804 to the low level. The one-shot circuit 804 that has received the CLR signal of the low level enters a state in which the next ON signal cannot be output. When the time set in the timer 513 has passed, the timer 513 sets the CLR signal to a high level. The one-shot circuit 804 that has received the CLR signal of the high level starts the operation and outputs a pulse to the gate terminal of the FET 708. If the voltage of the terminal 4 of the IC 1710 is low even after the output of the timer 513 has entered the high level, the error amplifier 803 is continuing the output of the low level. Therefore, the output of the timer 513 is in the low level, and operation is performed to maintain the stop state.

The operation time of the timer 513, i.e. period of clocking by the timer 513, is set to a period, $n \times (\pi/2 \text{ to } 3\pi/2)$: $n$ is an integer 1 or more, wherein the mechanical resonant period of the cores of the transformer 704 is $2\pi$. In this way, the stop period of the burst operation is determined. More particularly, the stop period of the burst operation is started at a timing that the voltage of the terminal 4 of the IC 1710 has become lower than the oscillation stop voltage 807. The stop period of the burst operation ends at a timing of $n \times \pi/2$ at the earliest and $n \times 3\pi/2$ at the latest. When a pulse signal is output to reduce the strain of the transformer 704 in the stop period of the burst operation, time (hereinafter, called "discharge time α") is necessary before the end of the discharge on the secondary side of the transformer 704 even after the end of the application of the pulse signal. The discharge time α is, for example, about a little over 10 μs that is smaller than the frequency (about 10 kHz) of the sound generated from the transformer 704. Therefore, the timing of the end of the stop period of the burst operation may be shifted by the discharge time α, such as $(n \times \pi/2 + \alpha)$ to $(n \times 3\alpha/2 + \alpha)$.

Therefore, even when the load 721 is large, at least one wave of pulse can be output to the gate terminal of the FET 708 depending on the voltage of the terminal 4, after entering the stop period of the burst operation. Even when the load 721 has become light, at least one wave of pulse can be always output to the gate terminal of the FET 708 after the end of the period set by the timer 513. In this way, the groaning sound of the transformer 704 can be reduced by a simple circuit.

According to the present embodiment, the sound generated from the transformer can be reduced, while reducing the switching loss in the power supply apparatus.

Fourth Embodiment

Figure 11B:
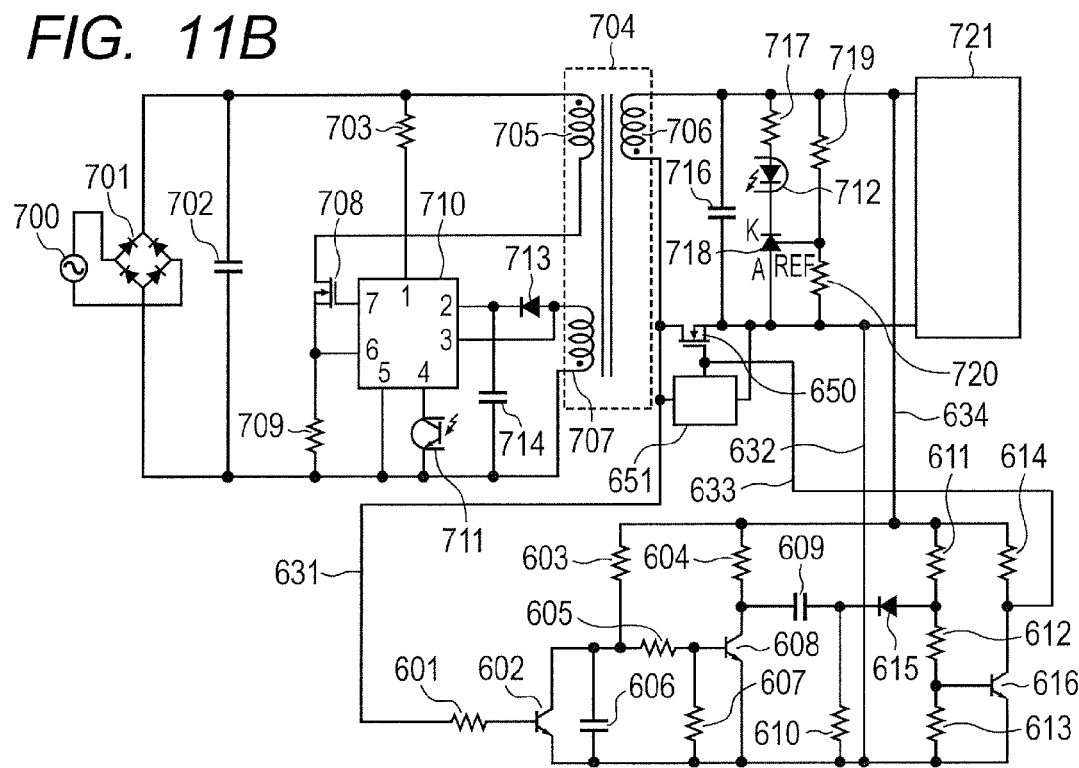
FIG. 11B illustrates a circuit diagram of the power supply apparatus according to the fourth embodiment.

A pulse for canceling out the strain of the transformer 704 can be applied not only from the primary side, but also from the secondary side. For example, such a circuit can be provided in a simple configuration if the power supply apparatus includes a synchronous rectification switch on the secondary side. FIG. 11B illustrates such an example. The same reference numerals are provided to the same configurations as in FIG. 1A, and the description will not be repeated.

[Configuration of Power Supply Apparatus]

As illustrated in FIG. 11B, a power supply apparatus of the present embodiment includes, on the secondary side, a synchronous rectification FET 650 as a second switching unit and a control circuit 651 of the synchronous rectification FET as a second control unit. The synchronous rectification FET 650 turns on or off to supply or block the current flowing through the secondary winding 706 of the transformer 704. The control circuit 651 turns on the synchronous rectification FET 650 when the control circuit 651 detects the current flowing between the drain and the source of the synchronous rectification FET 650 and turns off the synchronous rectification FET 650 when the current flowing between the drain and source is reduced to 0.

Since the output of at least one wave of pulse is controlled on the secondary side in the burst mode in the present embodiment, an ON/OFF signal equivalent to the signal output to the gate terminal of the FET 708 is acquired from a terminal 631 connected to the secondary winding 706 of the transformer 704. A terminal 632 is connected to the − terminal of the capacitor 716, and a terminal 634 is connected to the + terminal of the capacitor 716. A terminal 633 is connected to the gate terminal of the synchronous rectification FET 650.

A transistor 602 is turned on or off in response to the change in the voltage of the secondary winding 706 according to the output of an ON/OFF signal of the terminal 7 of the IC 710. Therefore, the voltage is not accumulated on a capacitor 606 if there is no burst operation of the IC 710, i.e. idle period of the switching operation of the FET 708. When the FET 708 pauses the switching operation along with the shift of the power supply apparatus to the burst mode and the burst operation by the IC 710, the transistor 602 maintains the OFF state. Therefore, the capacitor 606 is started to be charged with the voltage from the capacitor 716 through the terminal 634 and a resistor 603, and a transistor 608 is turned on. When the transistor 608 is turned on, the voltage on the cathode terminal side of a capacitor 609 and a diode 615 drops. A transistor 616 is turned off, and the voltage of the terminal 633 rises. When the voltage of the terminal 633 rises, the synchronous rectification FET 650 is turned on. When the synchronous rectification FET 650 is turned on, the current flows through the secondary winding 706 of the transformer 704, and a pulse can be applied from the secondary side of the transformer 704. In this case, on the secondary side of the transformer 704, the current flows through the path from the + side of the capacitor 716 to the − side of the secondary winding 706 of the transformer 704, the synchronous rectification FET 650 and the capacitor 716. Reference numerals 601, 604, 605, 607 and 610 to 614 denote resistors.

In this way, the IC 710 performs the burst operation, and the idle period of the switching operation of the FET 708 is generated. Consequently, the synchronous rectification FET 650 can be turned on after a certain time. The certain time is set to, for example, the period toff. The REF terminal voltage of the shunt regulator 718 may be increased to prevent the FET 708 from being turned on in the period in which the synchronous rectification FET 650 is turned on. To prevent a problem caused by operation of the transistor 616 during the operation of the control circuit 651, a resistor, etc., is used for the connection. Not only a time constant circuit, but also a logic circuit, such as CPU and ASIC, may be used to create the timing of supplying the pulse in the burst mode, and this can increase the accuracy of time.

According to the present embodiment, the sound generated from the transformer can be reduced, while reducing the switching loss in the power supply apparatus.

Fifth Embodiment

The power supply apparatuses described in the first to fourth embodiments can be applied as, for example, a low-voltage power supply of an image forming apparatus, i.e. a power supply that supplies electric power to a drive unit such as a controller (control unit) and a motor. Hereinafter, a configuration of the image forming apparatus provided with the power supply apparatuses of the first to fourth embodiments will be described.

[Configuration of Image Forming Apparatus]

Figure 12:
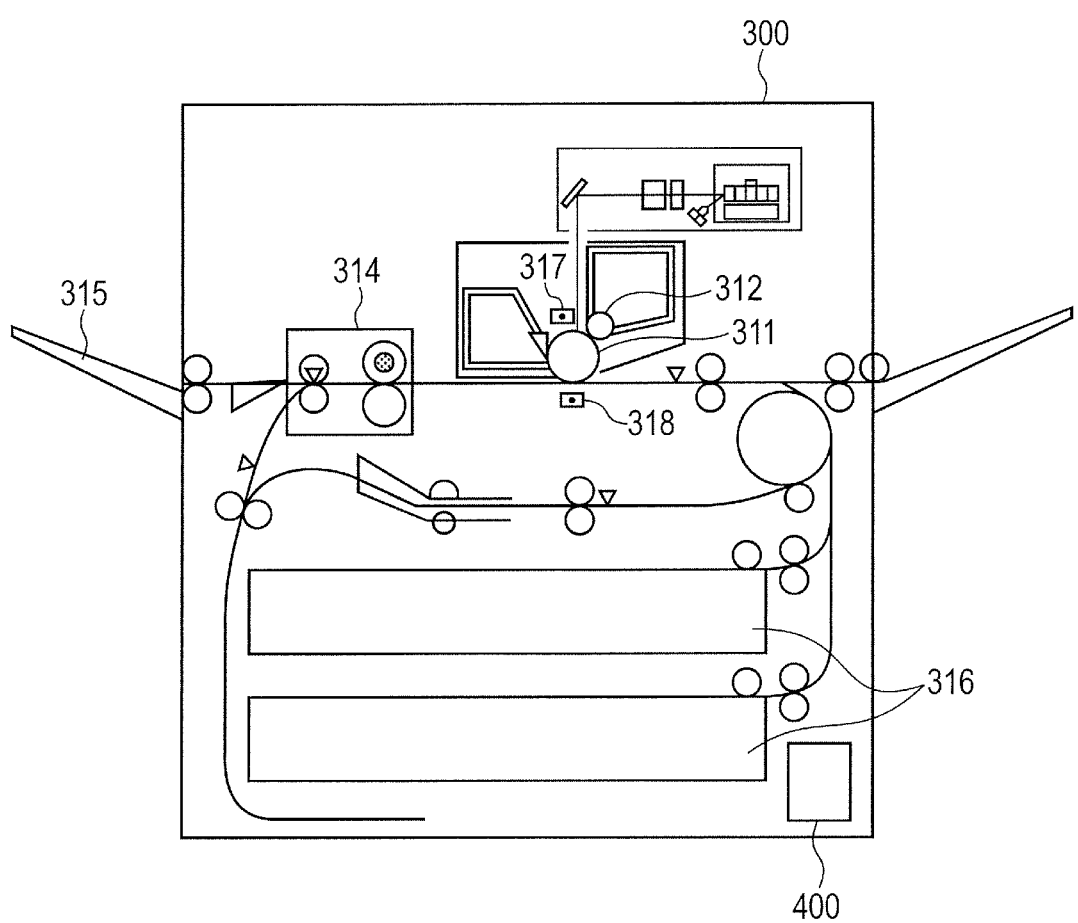
FIG. 12 is a diagram illustrating a configuration of an image forming apparatus according to a fifth embodiment.

A laser beam printer will be described as an example of the image forming apparatus. FIG. 12 illustrates a schematic configuration of the laser beam printer as an example of an electrophotographic printer. A laser beam printer 300 includes: a photosensitive drum 311 as an image carrier that forms an electrostatic latent image; a charge unit 317 (charging unit) that uniformly charges the photosensitive drum 311; and a development unit 312 (developing unit) that develops the electrostatic latent image formed on the photosensitive drum 311 by toner. A transfer unit 318 (transferring unit) transfers a toner image developed on the photosensitive drum 311 to a sheet (not illustrated) as a recording material supplied from a cassette 316, and a fixing device 314 fixes the toner image transferred to the sheet. The sheet is discharged to a tray 315. The photosensitive drum 311, the charge unit 317, the development unit 312 and the transfer unit 318 form the image forming unit. The laser beam printer 300 includes a power supply apparatus 400 described in the first to fourth embodiments. The image forming apparatus that can be provided with the power supply apparatus 400 of the first to fourth embodiments is not limited to the one illustrated in FIG. 12, and for example, an image forming apparatus may include a plurality of image forming units. An image forming apparatus may include: a primary transfer unit that transfers the toner image on the photosensitive drum 311 to an intermediate transfer belt; and a secondary transfer unit that transfers the toner image on the intermediate transfer belt to the sheet.

The laser beam printer 300 includes a controller not illustrated that controls image forming operation by the image forming unit and conveyance operation of the sheet, and the power supply apparatus 400 described in the first to fourth embodiments supplies electric power to, for example, the controller. The power supply apparatus 400 described in the first to fourth embodiments supplies electric power to a drive unit, such as a motor, that rotates the photosensitive drum 311 or that drives various rollers for conveying the sheets. Therefore, the load 721 of the first to fourth embodiments is equivalent to the controller or the drive unit. The image forming apparatus of the present embodiment can lighten the load to reduce the consumed power, such as by supplying electric power only to the controller, in a standby state that realizes power saving (for example, power saving mode or standby mode). In the image forming apparatus of the present embodiment, the power supply apparatus 400 described in the first to fourth embodiments performs the light-load burst operation in the power saving mode. When the image forming apparatus is operating in the power saving mode, the sound generated from the transformer 704 of the power supply apparatus 400 can be reduced by the configurations described in the first to fourth embodiments. Specifically, when the image forming apparatus shifts to the power saving mode, and the power supply apparatus is operating in the burst mode, at least one wave of pulse signal is applied to the FET 708 in the period from $\pi/2$ to $3\pi/2$ in which the velocity v of the cores of the transformer 704 is negative. As a result, the amplitude of the displacement amount x of the cores of the transformer 704 can be reduced, and the sound generated from the transformer 704 can be reduced.

According to the present embodiment, the sound generated from the transformer can be reduced, while reducing the switching loss in the power supply apparatus of the image forming apparatus.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-125587, filed Jun. 14, 2013, which is hereby incorporated by reference herein in its entirety.

What is claimed is:

1. A power supply apparatus, comprising:
 a transformer in which a primary side and a secondary side are insulated;
 a switch element that drives the primary side of the transformer; and
 a control unit that controls a drive frequency of the switch element,
 wherein, in a case where a state in which the switch element is driven at a first drive frequency is shifted to a state in which the switch element is driven at a second drive frequency lower than the first drive frequency, the control unit turns on the switch element at a timing according to a vibration cycle of the transformer, and
 wherein, an output voltage from the secondary side of the transformer in a state in which the switch element is driven at the second drive frequency is smaller than an output voltage from the secondary side of the transformer in a state in which the switch element is driven at the first drive frequency.

2. The power supply apparatus according to claim 1, wherein the control unit turns on the switch element where the vibration cycle of the transformer is $n \times \pi/2$ to $n \times 3\pi/2$ (n is an integer 1 or more), wherein one cycle of the free vibration is defined as $2\pi$.

3. The power supply apparatus according to claim 1, wherein the control unit comprises a terminal, wherein, in a case where a voltage according to an output voltage of the secondary side of the transformer is lower than a predetermined voltage, the voltage according to the output voltage is input into the terminal so as to control the switching operation to stop, and
 wherein the power supply apparatus comprises a timer circuit that maintains the voltage of the terminal at the voltage lower than the predetermined voltage regardless of the output voltage, for a predetermined time.

4. The power supply apparatus according to claim 1, wherein the control unit stops the switching operation for a predetermined time regardless of the output voltage after the voltage corresponding to the output voltage of the secondary side of the transformer becomes lower than the predetermined voltage.

5. The power supply apparatus according to claim 1, wherein the transformer has two center cores, each of which opposes with each other with a gap distance, and
 wherein a second timing includes a timing from a state in which the gap distance between the center cores is small to a state in which the gap distance is large.

6. The power supply apparatus according to claim 3, wherein the timer circuit comprises a resistor and a capacitor, and
 wherein the predetermined time is determined by time constants of the resistor and the capacitor.

7. The power supply apparatus according to claim 4, wherein the control unit starts the switching operation regardless of the output voltage after the lapse of the predetermined time.

8. The power supply apparatus according to claim 6, further comprising a pulse application circuit that sets the voltage of the terminal to a voltage equal to or higher than the predetermined voltage regardless of the output voltage after a lapse of the predetermined time.

9. An image forming apparatus comprising:
 an image forming unit that forms an image on a recording material; and
 a power supply that supplies electric power to the image forming apparatus,
 wherein the power supply comprises:
  a transformer in which a primary side and a secondary side are insulated;
  a switch element that drives the primary side of the transformer; and
  a control unit that controls a drive frequency of the switch element,
  wherein, in a case where a state in which the switch element is driven at a first drive frequency is shifted to a state in which the switch element is driven at a second drive frequency lower than the first drive frequency, the control unit turns on the switch element at a timing according to a vibration cycle of the transformer, and
  wherein, an output voltage from the secondary side of the transformer in a state in which the switch element is driven at the second drive frequency is smaller than an output voltage from the secondary side of the transformer in a state in which the switch element is driven at the first drive frequency.

10. The image forming apparatus according to claim 9, wherein the control unit turns on the switch element where the vibration cycle of the transformer is $n \times \pi/2$ to $n \times 3\pi/2$ (n is an integer 1 or more), wherein one cycle of the free vibration is defined as $2\pi$.

11. A power supply apparatus comprising:
   a transformer in which a primary side and a secondary side are insulated;
   a switch element that drives the primary side of the transformer; and
   a control unit that controls an driving operation of the switch element,
   wherein the transformer has two center cores, each of which opposes with each other with a gap distance; and
   wherein, in a condition where the transformer vibrates, when the gap distance is a second distance that is larger than a first distance that is the distance in a condition where the transformer does not vibrate, the control unit controls the switch element to turn the switch element on.

12. The power supply apparatus according to claim 11, wherein the gap distance displacement amount of the transformer varies according to a vibration cycle driving period of the transformer.

13. An image forming apparatus comprising:
   an image forming unit that forms an image on a recording material; and
   a power supply apparatus that supplies electric power to the image forming apparatus,
   wherein the power supply apparatus comprises:
      a transformer in which a primary side and a secondary side are insulated;
      a switch element that drives the primary side of the transformer; and
      a control unit that controls an driving operation of the switch element,
      wherein the transformer has two center cores, each of which opposes with each other with a gap distance, and
   wherein, in a condition where the transformer vibrates, when the gap distance is a second distance that is larger than a first distance that is the distance in a condition where the transformer does not vibrate, the control unit controls the switch element to turn the switch element on.

14. The image forming apparatus according to claim 13, wherein the gap distance displacement amount of the transformer varies according to a vibration cycle driving period of the transformer.

* * * * *